US010619570B2

(12) United States Patent
Foutch et al.

(10) Patent No.: US 10,619,570 B2
(45) Date of Patent: Apr. 14, 2020

(54) DENDRITIC HEAT EXCHANGERS AND METHODS OF UTILIZING THE SAME

(71) Applicant: The Boeing Company, Chicago, IL (US)

(72) Inventors: David William Foutch, Seattle, WA (US); Belur Shivashankara, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 15/812,971

(22) Filed: Nov. 14, 2017

(65) Prior Publication Data

US 2019/0145318 A1    May 16, 2019

(51) Int. Cl.
*F01D 25/12*    (2006.01)
*F02C 7/18*    (2006.01)
(Continued)

(52) U.S. Cl.
CPC .............. *F02C 7/185* (2013.01); *F01D 25/12* (2013.01); *F02C 7/045* (2013.01); *F02C 7/14* (2013.01);
(Continued)

(58) Field of Classification Search
CPC .......... F01D 25/12; F02C 17/185; F02C 7/14; F05D 2260/213; F05D 2260/22141; F05D 2260/96; F28D 2021/0026; F28F 2210/02
See application file for complete search history.

(56) References Cited

U.S. PATENT DOCUMENTS

| 1,768,222 A | * | 6/1930 | Uhde | ...................... F22G 1/005 165/163 |
| 3,205,939 A | * | 9/1965 | Huet | ......................... F22B 1/16 165/144 |

(Continued)

FOREIGN PATENT DOCUMENTS

| EP | 3121429 | 1/2017 |
| FR | 2549585 | 1/1985 |

(Continued)

OTHER PUBLICATIONS

Machine-generated English translation of the abstract for FR 2549585, downloaded from Espacenet.com Jun. 10, 2019.
(Continued)

*Primary Examiner* — Ninh H. Nguyen
(74) *Attorney, Agent, or Firm* — DASCENZO Intellectual Property Law, P.C.

(57) ABSTRACT

Dendritic heat exchangers and methods of utilizing the same are disclosed herein. The dendritic heat exchangers include an elongate housing extending between a first end and a second end. The elongate housing defines a housing volume, a first fluid inlet, a first fluid outlet, a second fluid inlet, and a second fluid outlet. The dendritic heat exchangers also include a heat exchange structure extending within the housing volume. The heat exchange structure is configured to receive a second fluid inlet stream from the second fluid inlet and to provide a second fluid outlet stream to the second fluid outlet. The heat exchange structure includes a plurality of dendritic tubulars. Each dendritic tubular includes an inlet region, which defines an inlet conduit, and a branching region. The branching region defines a plurality of branch conduits that extends from the inlet conduit. The methods include methods of utilizing the dendritic heat exchangers.

23 Claims, 9 Drawing Sheets

(51) Int. Cl.
    *F28D 1/047*     (2006.01)
    *F02C 7/045*     (2006.01)
    *F02C 7/14*      (2006.01)
    *F28D 7/10*      (2006.01)
    *F02C 7/24*      (2006.01)
    *F28D 21/00*     (2006.01)
    *B64D 27/18*     (2006.01)

(52) U.S. Cl.
    CPC ............... *F02C 7/24* (2013.01); *F28D 1/047* (2013.01); *F28D 7/103* (2013.01); *B64D 27/18* (2013.01); *F05D 2220/323* (2013.01); *F05D 2260/213* (2013.01); *F05D 2260/221* (2013.01); *F05D 2260/2214* (2013.01); *F05D 2260/96* (2013.01); *F05D 2260/963* (2013.01); *F05D 2260/98* (2013.01); *F28D 2021/0021* (2013.01); *F28D 2021/0026* (2013.01); *F28F 2210/02* (2013.01)

(56) References Cited

U.S. PATENT DOCUMENTS

| | | | | |
|---|---|---|---|---|
| 3,229,762 | A * | 1/1966 | Vollhardt | F22B 1/021 |
| | | | | 165/157 |
| 4,060,127 | A * | 11/1977 | Savin | F28D 7/1669 |
| | | | | 165/145 |
| 4,151,710 | A * | 5/1979 | Griffin | F02C 7/14 |
| | | | | 184/6.11 |
| 4,203,392 | A * | 5/1980 | McLane | F22B 9/02 |
| | | | | 122/134 |
| 4,266,602 | A | 5/1981 | White et al. | |
| 5,544,703 | A * | 8/1996 | Joel | F28F 3/048 |
| | | | | 165/166 |
| 2013/0020061 | A1 * | 1/2013 | Bergh | F28D 1/0316 |
| | | | | 165/166 |
| 2016/0040942 | A1 | 2/2016 | Dziubinschi et al. | |
| 2017/0248372 | A1 * | 8/2017 | Erno | F28F 9/0275 |
| 2017/0276440 | A1 * | 9/2017 | Kenworthy | F28D 7/1607 |
| 2019/0024987 | A1 * | 1/2019 | Moore | B33Y 10/00 |

FOREIGN PATENT DOCUMENTS

| | | |
|---|---|---|
| GB | 588520 | 5/1947 |
| GB | 2476855 | 7/2011 |
| WO | WO 2014/068326 | 5/2014 |
| WO | WO 2017/117088 | 7/2017 |

OTHER PUBLICATIONS

European Patent Office, Extended European Search Report for related European Application No. 18205902, dated Mar. 18, 2019.
European Patent Office, Extended European Search Report for related European Application No. 18205866, dated Apr. 4, 2019.

* cited by examiner

DENDRITIC HEAT EXCHANGERS AND METHODS OF UTILIZING THE SAME

FIELD

The present disclosure relates generally to dendritic heat exchangers and/or to methods of utilizing the dendritic heat exchangers.

BACKGROUND

Heat exchangers may be utilized to exchange thermal energy, or heat, between a first fluid stream and a second fluid stream while maintaining fluid isolation between the two fluid streams. Often, the first fluid is a readily available fluid, such as water or air, and the second fluid is a heat exchange fluid that flows within a closed loop and is utilized to cool a cooled component. Examples of heat exchange fluids include water, hydrocarbon fluids, fluorocarbon fluids, and/or refrigerants.

In some systems, such as jet engines for aircraft, space may be extremely limited and competing system priorities may dictate the maximum size, the shape, and/or the positioning of heat exchangers. These variables may create trade-offs with other components of the system. Thus, there exists a need for dendritic heat exchangers and/or for methods of utilizing the same.

SUMMARY

Dendritic heat exchangers and methods of utilizing the same are disclosed herein. The dendritic heat exchangers include an elongate housing extending between a first end and a second end. The elongate housing defines a housing volume, a first fluid inlet, a first fluid outlet, a second fluid inlet, and a second fluid outlet. The first fluid inlet is configured to receive a first fluid stream into the housing volume as a first fluid inlet stream, and the first fluid outlet is configured to emit the first fluid stream from the housing volume as a first fluid outlet stream. The second fluid inlet is configured to receive a second fluid stream into the housing volume as a second fluid inlet stream, and the second fluid outlet is configured to emit the second fluid stream from the housing volume as a second fluid outlet stream.

The dendritic heat exchangers also include a heat exchange structure extending within the housing volume. The heat exchange structure is configured to receive the second fluid inlet stream from the second fluid inlet and to provide the second fluid outlet stream to the second fluid outlet. The heat exchange structure includes a plurality of dendritic tubulars. Each dendritic tubular includes an inlet region that defines an inlet conduit configured to receive a portion of the second fluid inlet stream from the second fluid inlet. Each dendritic tubular also includes a branching region that defines a plurality of branch conduits that extends from the inlet conduit. Each branch conduit is configured to receive a respective fraction of the portion of the second fluid inlet stream from the inlet conduit and to provide the respective fraction of the portion of the second fluid inlet stream to the second fluid outlet to at least partially define the second fluid outlet stream.

The methods include methods of utilizing the dendritic heat exchangers.

DESCRIPTION

Figure 1:
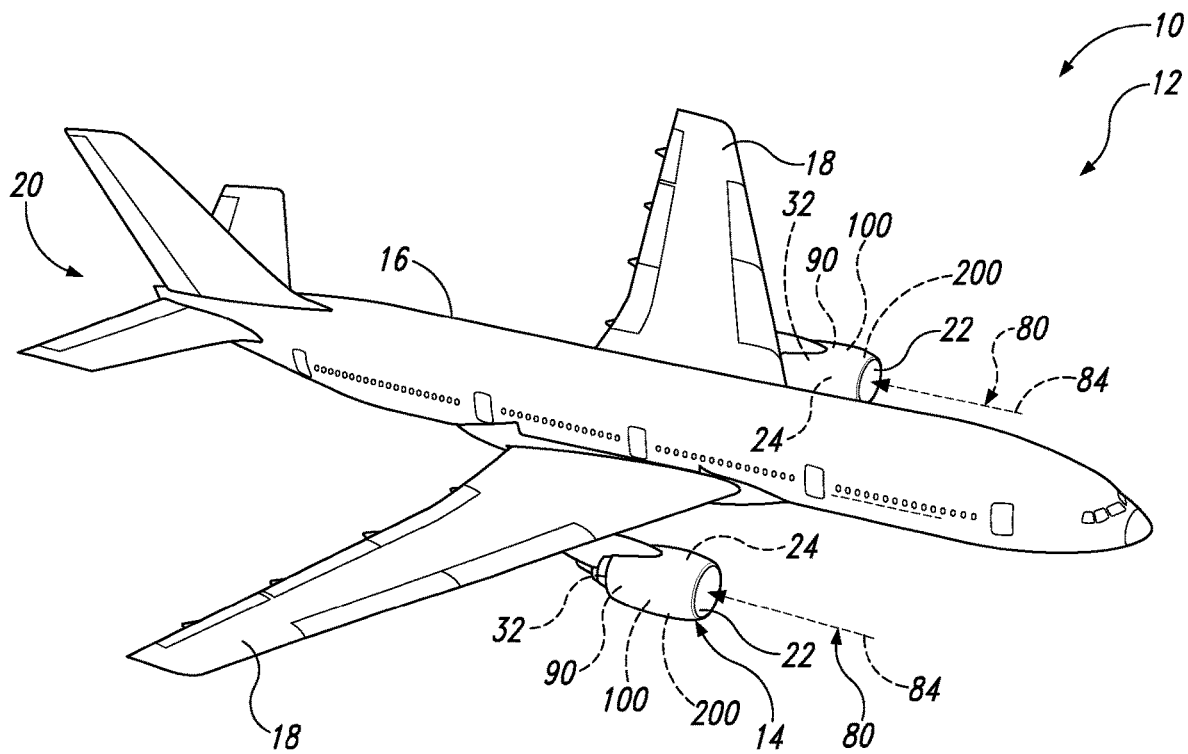
FIG. 1 is a schematic representation of a system, such as an aircraft that may include a jet engine, that may include and/or utilize sound-attenuating heat exchangers and/or dendritic heat exchangers according to the present disclosure.

FIGS. 1-15 provide illustrative, non-exclusive examples of sound-attenuating heat exchangers 100, of dendritic heat exchangers 200, of methods 300, and/or of methods 400, according to the present disclosure, as well as of systems 10 that may include and/or utilize the sound-attenuating heat exchangers, the dendritic heat exchangers, and/or the methods disclosed herein. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
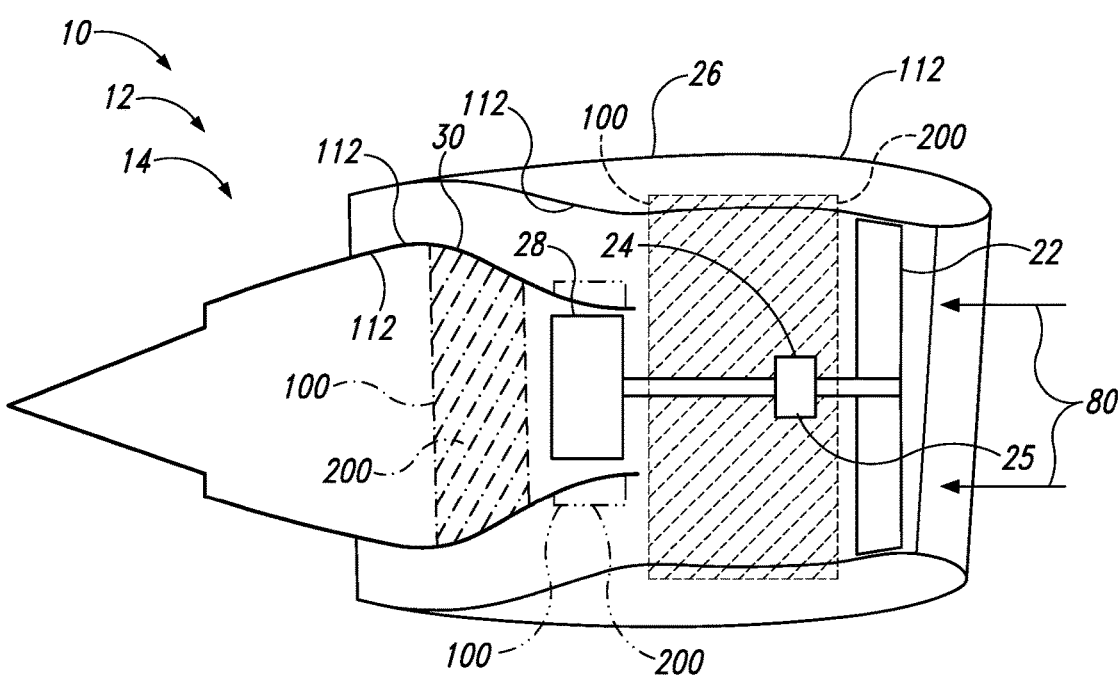
FIG. 2 is a schematic cross-sectional view of a jet engine that may include and/or utilize sound-attenuating heat exchangers and/or dendritic heat exchangers according to the present disclosure.

FIG. 1 is a schematic representation of a system 10, such as an aircraft 12 that may include a jet engine 14, that may include and/or utilize sound-attenuating heat exchangers 100 and/or dendritic heat exchangers 200 according to the present disclosure. FIG. 2 is a schematic cross-sectional view of jet engine 14. Jet engine 14 also may be referred to herein as and/or may be a jet engine assembly 14 and/or a jet engine and nacelle assembly 14. As illustrated in FIG. 1, systems 10 that include aircraft 12 may include an airframe 16, a plurality of wings 18, and a tail 20. Sound-attenuating heat exchangers 100 and/or dendritic heat exchangers 200, which are disclosed herein, may be utilized to exchange thermal energy between a first fluid stream 80, which includes a first fluid 84, and a second fluid stream 90, which also may be referred to herein as a cooled stream 90. As discussed in more detail herein, first fluid stream 80 may include air, or ambient air, that surrounds system 10 and/or that is compressed by a fan 22 of jet engine 14. In contrast, second fluid stream 90 may flow within a closed loop within system 10 and/or may be utilized to cool a cooled component 24 of system 10. Stated another way, system 10 may include a heat transfer system 32, and second fluid stream 90 may flow in an enclosed loop therein. Examples of cooled component 24 include one or more components of system 10, of aircraft 12, and/or of jet engine 14, such as a gear box, a bearing, and/or an electrical generator.

Turning now to FIG. 2, jet engines 14 that include sound-attenuating heat exchangers 100 and/or dendritic heat exchangers 200, which are disclosed herein, may include a nacelle 26 that surrounds, provides a housing for, and/or directs air into the jet engine. Jet engines 14 also may include a fan 22, which may provide initial compression of a first fluid stream 80, such as air, that flows into the jet engine. Fan 22 may be driven by a turbine assembly 28 via a cooled component 24, such as a gear box 25. Turbine assembly 28 may be positioned within a turbine housing 30. Jet engines 14 may have and/or define a plurality of aerodynamically shaped surfaces 112.

Sound-attenuating heat exchangers 100 and/or dendritic heat exchangers 200 may be positioned at any suitable location within jet engines 14. As an example, and as illustrated in dashed lines, sound-attenuating heat exchangers 100 and/or dendritic heat exchangers 200 may form, define, and/or be operatively attached to a portion of an aerodynamically shaped surface 112 of nacelle 26, such as an internal surface of the nacelle and/or a fan housing that is at least partially defined by, or operatively attached to, the nacelle. As another example, sound-attenuating heat exchangers 100 and/or dendritic heat exchangers 200 may form, define, and/or be operatively attached to an aerodynamically shaped surface 112 of turbine housing 30, such as an internal surface of the turbine housing, as illustrated in dash-dot lines, and/or an external surface of the turbine housing, as illustrated in dash-dot-dot lines.

Figure 3:
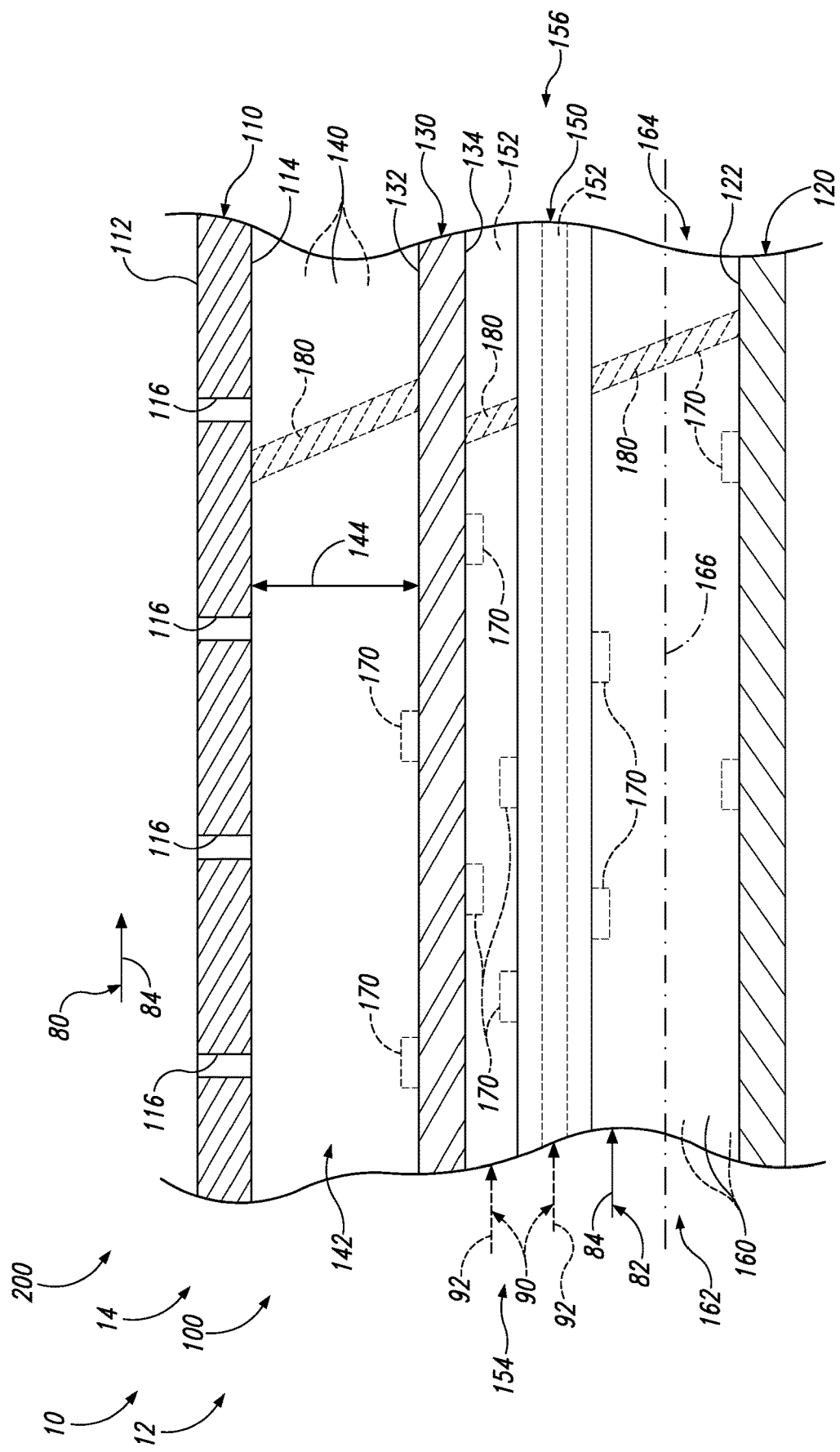
FIG. 3 is a schematic illustration of sound-attenuating heat exchangers according to the present disclosure.

FIG. 3 is a schematic illustration of sound-attenuating heat exchangers 100 according to the present disclosure, while FIGS. 4-7 are less schematic transverse cross-sectional views illustrating examples of sound-attenuating heat exchangers 100. As illustrated in FIGS. 3-8, sound-attenuating heat exchangers 100 include an aerodynamically shaped layer 110, a base 120, an intermediate layer 130 that extends at least partially between the aerodynamically shaped layer and the base, and a cooled fluid containment body 150.

Aerodynamically shaped layer 110 may define an aerodynamically shaped surface 112 and an opposed intermediate layer-facing surface 114. Aerodynamically shaped surface 112 may be shaped to direct flow of a first fluid stream 80 that includes a first fluid 84. Aerodynamically shaped layer 110 also may define a plurality of apertures 116.

Base 120 defines a base surface 122 that faces toward intermediate layer 130. Intermediate layer 130 defines a shaped layer-facing surface 132 and an opposed base-facing surface 134. Shaped layer-facing surface 132 faces toward, or generally toward, aerodynamically shaped layer 110, while base-facing surface 134 faces toward, or generally toward, base 120.

Intermediate layer-facing surface 114 at least partially defines a sound-attenuating volume 140. Sound-attenuating volume 140 is configured to be in fluid communication with first fluid stream 80 via apertures 116. In addition, sound-attenuating volume 140 is configured to attenuate sound within first fluid stream 80. Stated another way, sound-attenuating volume 140 may be configured to attenuate, to dampen, and/or to absorb sound, or sound waves, that are present and/or that propagate within first fluid stream 80, thereby decreasing an intensity, an energy, and/or a loudness of the sound waves. Such a configuration may decrease a level of noise emitted by systems 10 that include sound-attenuating heat exchangers 100. As an example, and when, as illustrated in FIG. 2, sound-attenuating heat exchangers 100 are utilized within jet engines 14, the presence of sound-attenuating heat exchangers 100 within jet engines 14 may decrease the intensity, energy, and/or loudness of sound, or sound waves, emitted from the jet engine.

Base surface 122 at least partially defines an elongate cooling conduit 160. As illustrated in FIG. 3, elongate cooling conduit 160 may extend between a cooling conduit inlet 162 and a cooling conduit outlet 164. Elongate cooling conduit 160 is configured to receive a cooling stream 82, which includes first fluid 84, in heat exchange relationship with cooled fluid containment body 150. Returning more generally to FIGS. 3-7, sound-attenuating volume 140 is distinct, or fluidly isolated from, elongate cooling conduit 160. In addition, intermediate layer 130 at least partially fluidly isolates the sound-attenuating volume from the elongate cooling conduit.

Cooled fluid containment body 150 at least partially defines at least one cooled fluid containment conduit 152. As illustrated in FIG. 3, cooled fluid containment conduit 152 extends between a cooled fluid containment conduit inlet 154 and a cooled fluid containment conduit outlet 156 and is configured to receive a cooled stream 90 that includes a second fluid 92. Examples of second fluid 92 include a heat transfer fluid, a heat transfer liquid, an oil, a hydrocarbon, a fluorocarbon, and/or a refrigerant.

Figure 14:
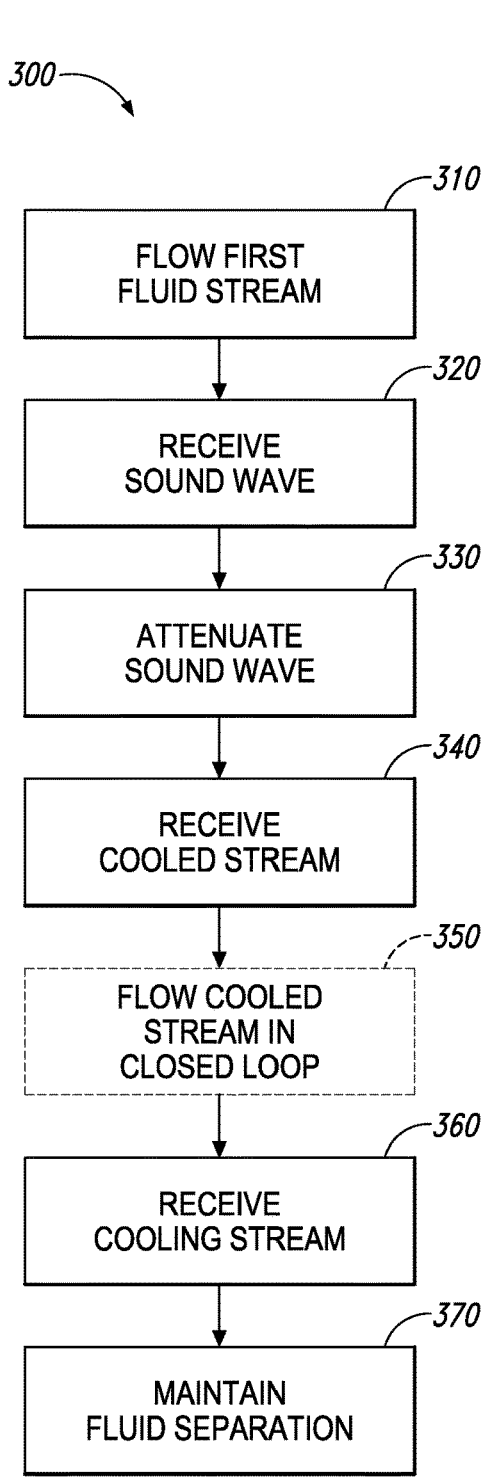
FIG. 14 is a flowchart depicting methods, according to the present disclosure, of exchanging heat and attenuating sound.

During operation of sound-attenuating heat exchangers 100, and as discussed in more detail herein with reference to methods 300 of FIG. 14, first fluid stream 80 may flow, or be flowed, past and/or across aerodynamically shaped surface 112. As an example, and when sound-attenuating heat exchangers 100 are utilized in aircraft 12 of FIGS. 1-2, the aircraft may be flown and/or jet engine 14 may be operated, thereby providing a motive force for flow of first fluid stream 80, in the form of air, or ambient air, past one or more aerodynamically shaped surfaces 112 of aircraft 12 and/or of jet engine 14 thereof.

When first fluid stream 80 flows across aerodynamically shaped surface 112, sound waves present within the first fluid stream may be received into sound-attenuating volume 140 via apertures 116. Sound-attenuating volume 140 may be configured such that receipt of the sound waves therein may dampen, attenuate, absorb, and/or cause destructive interference of the sound waves, thereby decreasing a noise level in the vicinity of sound-attenuating heat exchanger 100. As an example, sound-attenuating volume 140 may be, may define, and/or may be shaped to define a Helmholtz resonator 142 that is shaped to resonate at a resonant frequency that is at, or near, a frequency of the sound waves. As a more specific example, sound-attenuating volume 140 may be sized such that a distance that a sound wave travels, upon entering the sound-attenuating volume, may be approximately twice a wavelength of the sound wave. In the configuration that is illustrated in FIG. 3, this may be accomplished by specifying a distance 144 to be approximately twice the wavelength of the sound wave. In the configurations illustrated in FIGS. 4-7, this may be accomplished via selection of the angles and/or dimensions of the triangularly shaped sound-attenuating volume and is discussed in more detail herein. As additional examples, one or more materials present within sound-attenuating volume 140 may absorb sound energy, may attenuate sound energy, and/or may attenuate sound energy via viscous losses.

Figure 6:
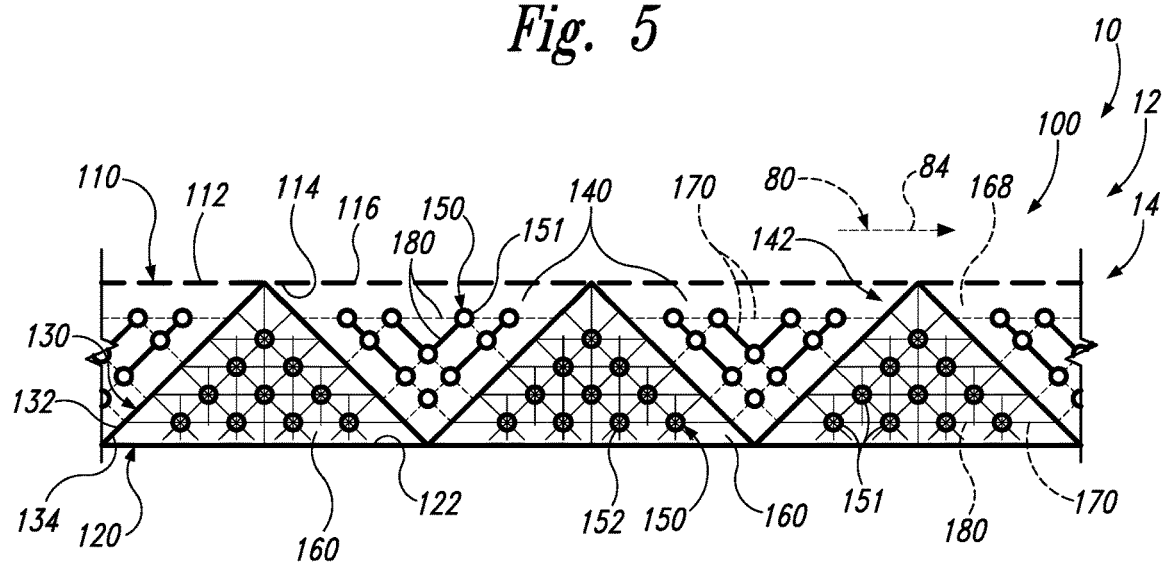
FIG. 6 is a less schematic cross-sectional view illustrating an example of a sound-attenuating heat exchanger according to the present disclosure.
Figure 7:
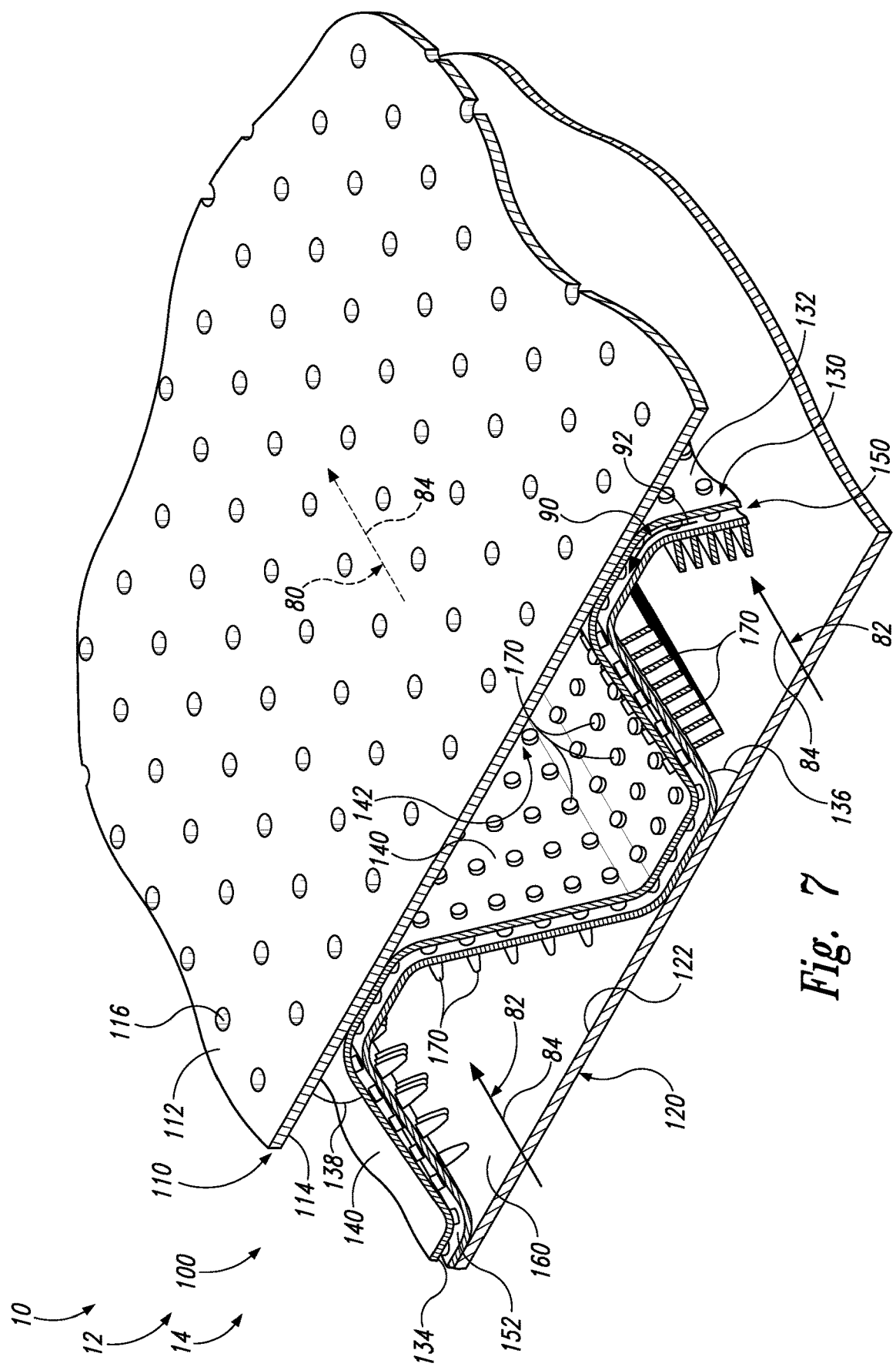
FIG. 7 is a less schematic cross-sectional view illustrating an example of a sound-attenuating heat exchanger according to the present disclosure.

Concurrent with flow of first fluid stream 80 across aerodynamically shaped surface 112, and as perhaps illustrated most clearly in FIGS. 3 and 7, cooled stream 90, which includes second fluid 92, flows, or is flowed, through cooled fluid containment conduit 152. In addition, cooling stream 82, which includes first fluid 84, flows, or is flowed, through elongate cooling conduit 160. In the transverse cross sections of FIGS. 4-6, flow of the cooled stream and the cooling stream is into and/or out of the plane of the illustration. Flow of cooled stream 90 through cooled fluid containment conduit 152 and concurrent flow of cooling stream 82 through elongate cooling conduit 160 facilitated thermal exchange between cooled stream 90 and cooling stream 82 while maintaining fluid separation between the cooled stream and the cooling stream.

Figure 4:
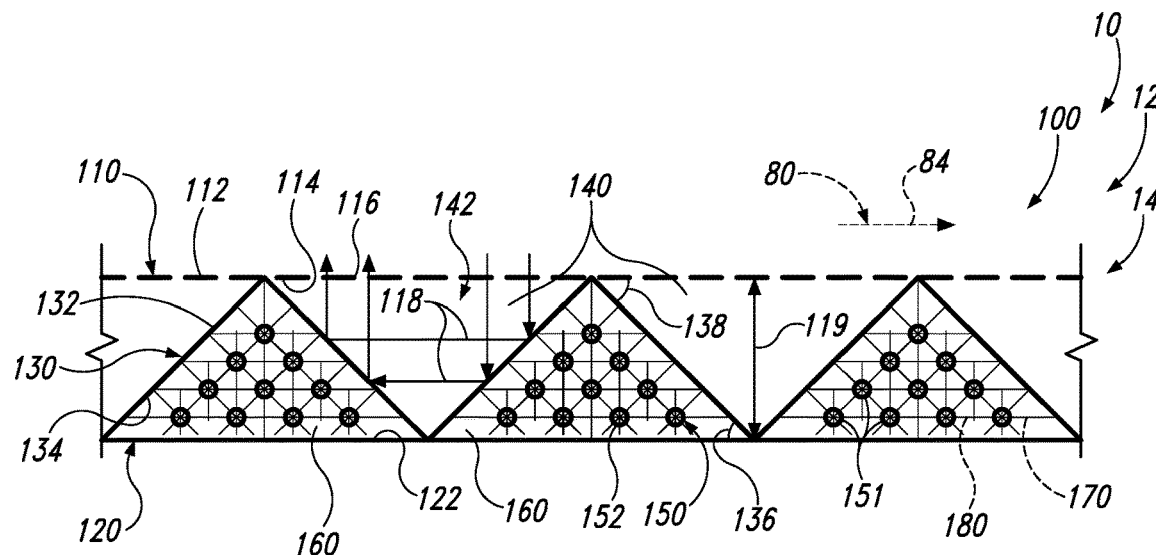
FIG. 4 is a less schematic cross-sectional view illustrating an example of a sound-attenuating heat exchanger according to the present disclosure.
Figure 5:
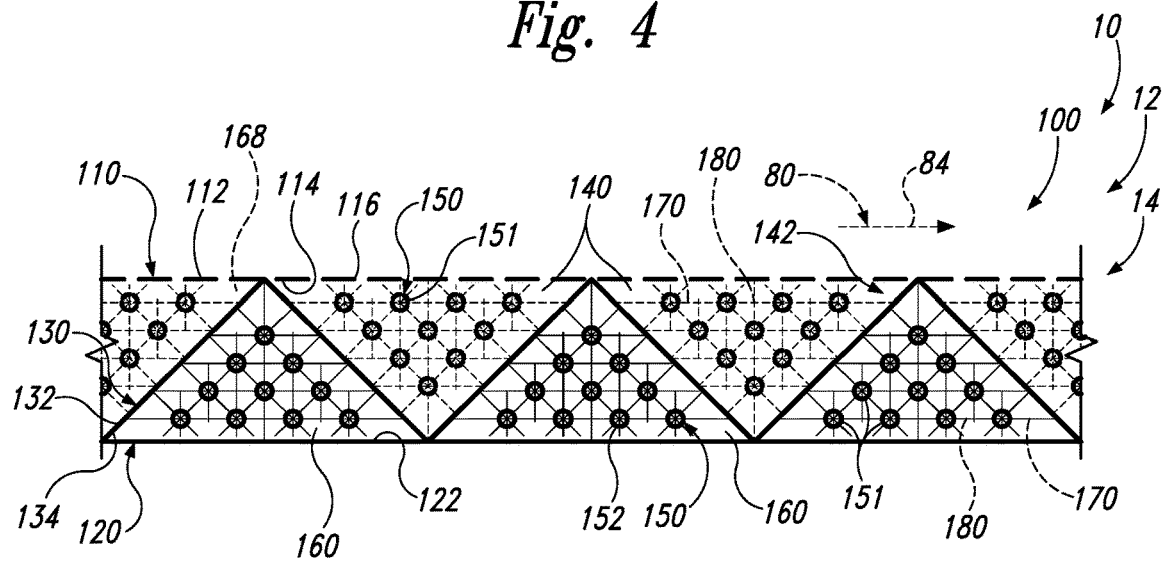
FIG. 5 is a less schematic cross-sectional view illustrating an example of a sound-attenuating heat exchanger according to the present disclosure.

It is within the scope of the present disclosure that sound-attenuating volume 140 and/or elongate cooling conduit 160 may have any suitable configuration, shape, cross-sectional shape, and/or transverse cross-sectional shape. As examples, and as illustrated in FIGS. 4-6, the sound-attenuating volume and the elongate cooling conduit may have a triangular, an at least substantially triangular, an isosceles triangular, and/or an at least substantially isosceles triangular transverse cross-sectional shape, which may be measured transverse to a longitudinal axis 166 of elongate cooling conduit 160, as illustrated in FIG. 3. As additional examples, the transverse cross-sectional shape of sound-attenuating volume 140 and/or of elongate cooling conduit 160 may be rectangular, at least substantially rectangular, trapezoidal, and/or polygonal.

It is within the scope of the present disclosure that sound-attenuating heat exchangers 100 may be flat, at least substantially flat, thin, and/or layer-like. As an example, and returning to FIG. 3, a distance, or an average distance, between intermediate layer-facing surface 114 and base surface 122 may be less than a threshold fraction of a maximum extent of aerodynamically shaped surface 112. As another example, a distance, or an average distance, between intermediate layer-facing surface 114 and base surface 122 may be less than a threshold fraction of a minimum extent of aerodynamically shaped surface 112. Examples of the threshold fraction include threshold fractions of less than 25%, less than 20%, less than 15%, less than 10%, less than 5%, less than 2.5%, and/or less than 1%.

It is also within the scope of the present disclosure that a distance, or an average distance, between aerodynamically shaped layer 110 and base 120 may have any suitable value. As examples, the distance between aerodynamically shaped layer 110 and base 120 may be at least 1 centimeter (cm), at least 1.5 cm, at least 2 cm, at least 2.5 cm, at least 3 cm, at least 3.5 cm, at least 4 cm, at least 5 cm, at least 6 cm, at least 8 cm, at least 10 cm, at most 30 cm, at most 25 cm, at most 20 cm, at most 15 cm, at most 10 cm, at most 8 cm, at most 6 cm, and/or at most 5 cm.

It is within the scope of the present disclosure that sound-attenuating heat exchangers 100 may include a plurality of distinct sound-attenuating volumes 140. Similarly, sound-attenuating heat exchangers 100 may include and/or define a plurality of distinct elongate cooling conduits 160.

As illustrated in FIGS. 3-7, sound-attenuating heat exchangers 100 may include a plurality of heat transfer-enhancing structures 170. Heat transfer-enhancing structures 170, when present, may be configured to enhance heat transfer between cooled stream 90 and cooling stream 82 and may have and/or define any suitable size, shape, and/or configuration. In general, heat transfer-enhancing structures 170 may increase a surface area for heat transfer between the cooled stream and the cooling stream and/or may generate turbulence and/or mixing within the cooled stream and/or within the cooling stream. Heat transfer-enhancing structures 170 may have any suitable form. As examples, heat transfer-enhancing structures 170 may include one or more of a plurality of projections, a plurality of pins, a plurality of posts, and/or a plurality of fins. Such heat transfer-enhancing structures 170 may project from intermediate layer-facing surface 114 and within sound-attenuating volume 140, from shaped layer-facing surface 132 and within sound-attenuating volume 140, from base-facing surface 134 and within elongate cooling conduit 160, from base surface 122 and within elongate cooling conduit 160, from cooled fluid containment body 150 and within elongate cooling conduit 160, from cooled fluid containment body 150 and within cooled fluid containment conduit 152, and/or from base-facing surface 134 and within cooled fluid containment conduit 152.

As illustrated in FIGS. 3-6, sound-attenuating heat exchangers 100 also may include supporting elements 180. Supporting elements 180, when present, may support aerodynamically shaped layer 110, base 120, intermediate layer 130, and/or cooled fluid containment body 150. As an example supporting elements 180 may extend between two or more components of sound-attenuating heat exchanger 100 and may be utilized to maintain a fixed, or at least substantially fixed, relative orientation among the two or more components of the sound-attenuating heat exchanger. As more specific examples, one or more supporting elements 180 may extend between aerodynamically shaped layer 110 and intermediate layer 130, between intermediate layer 130 and cooled fluid containment body 150, between cooled fluid containment body 150 and base 120, and/or between two or more cooled fluid containment bodies 150.

It is within the scope of the present disclosure that supporting elements 180 may be separate, distinct, and/or spaced-apart from heat transfer-enhancing structures 170, when both are present. Alternatively, it is also within the scope of the present disclosure that a single structure may function both as a heat transfer-enhancing structure 170 and as a supporting element 180. Such a single structure may extend between two or more components of sound-attenuating heat exchanger 100, thereby supporting the two or more components, and may be thermally conductive, thereby improving heat transfer from, or between, the two or more components.

Turning more specifically to FIGS. 4-6, examples of sound-attenuating heat exchangers 100 that include a plurality of sound-attenuating volumes 140 and a plurality of elongate cooling conduits 160 with triangular, or at least substantially triangular, transverse cross-sectional shapes are illustrated. In these sound-attenuating heat exchangers 100, sound-attenuating volume 140 is defined between, or even completely by, aerodynamically shaped layer 110 and intermediate layer 130. In addition, elongate cooling conduit 160 is defined between, or even completely by, intermediate layer 130 and base 120.

As illustrated, intermediate layer 130 may extend, in a zigzag, periodic, repeating, and/or saw-tooth pattern between aerodynamically shaped layer 110 and base 120, thereby defining the triangular transverse cross-sectional shapes of sound-attenuating volumes 140 and elongate cooling conduits 160. As discussed, FIGS. 4-6 illustrate transverse cross-sections of sound-attenuating volumes 140 and elongate cooling conduits 160, which extend in a direction that is perpendicular to the illustrated plane. In the example of elongate cooling conduits 160, this extension may be between a cooling conduit inlet and a cooling conduit outlet, as indicated in FIG. 3 at 162 and 164, respectively.

As illustrated in FIG. 4, intermediate layer 130 may intersect, or contact, base 120 at a base intersection angle 136 and may intersect, or contact, aerodynamically shaped layer 110 at an aerodynamically shaped layer intersection angle 138. Examples of base intersection angle 136 and/or of aerodynamically shaped layer intersection angle 138 include angles of at least 30 degrees, at least 35 degrees, at least 40 degrees, at least 45 degrees, at most 60 degrees, at most 55 degrees, at most 50 degrees, and/or at most 45 degrees.

In one example, base intersection angle 136 and aerodynamically shaped layer intersection angle 138 may be equal, or at least substantially equal, to 45 degrees. In this example, and as illustrated in FIG. 4, a distance 118 traveled by sound waves that enter sound-attenuating volume 140 via apertures 116 may be equal, or at least substantially equal, regardless of where the sound waves enter the sound-attenuating volume. In addition, distance 118 may be equal to twice the wavelength of the sound waves when a largest distance 119 from intermediate layer-facing surface 114 to shaped layer-facing surface 132 is equal to the wavelength of the sound to be attenuated.

In the examples of FIGS. 4-6, cooled fluid containment body 150 includes at least one, and optionally a plurality of distinct, cooled fluid containment tubulars 151. Cooled fluid containment tubulars 151 extend within elongate cooling conduits 160 and along a longitudinal axis of cooled fluid containment conduits 152. Supporting elements 180, which are discussed herein, may extend between pairs of cooled fluid containment tubulars 151, between a given cooled fluid containment tubular 151 and base 120, and/or between a given cooled fluid containment tubular 151 and intermediate layer 130. Stated another way, sound-attenuating heat exchanger 100 may include at least a first cooled fluid containment tubular 151 and a second cooled fluid containment tubular 151. The first cooled fluid containment tubular may be supported by one or more first supporting elements 180, while the second cooled fluid containment tubular may be supported by one or more second supporting elements 180. It is within the scope of the present disclosure that supporting elements 180 may be fluid-permeable and/or fluid-impermeable. When supporting elements 180 are fluid-permeable, the supporting elements may permit, or even generate, flow of the cooling stream within elongate cooling conduit 160 in directions that are skew to a longitudinal axis of the elongate cooling conduit. The fluid-permeable supporting elements 180 additionally or alternatively may absorb and/or attenuate noise, or noise energy, from first fluid stream 80. When supporting elements 180 are fluid-impermeable, the supporting elements may extend along a length of cooled fluid containment tubulars 151 and may restrict flow of the cooling stream in directions that are generally parallel to the longitudinal axis of the elongate cooling conduit. The fluid-impermeable supporting elements 180 additionally or alternatively may direct, or trap, sound waves into and/or within channels that are formed by the fluid-impermeable supporting elements. This may permit absorption and/or attenuation of these sound waves over different, varying, and/or selected distances.

In the example illustrated in FIG. 4, sound-attenuating volumes 140 are open, are empty, and/or do not include any structures therein. In contrast, and in the example of FIG. 5, sound-attenuating volumes 140 include cooled fluid containment tubulars 151 and corresponding supporting elements 180 extending therein. In this example, sound-attenuating volumes 140 also may be, may function as, and/or may be referred to herein as supplemental elongate cooling conduits 168. Under these conditions, cooling stream 82 also may flow within, through, and/or along a length of supplemental elongate cooling conduits 168. These supporting elements 180 are illustrated in dashed lines to indicate that the supporting elements may be fluid-permeable. In the example of FIG. 6, and similar to FIG. 5, sound-attenuating volumes 140 include fluid containment tubulars 151 and corresponding supporting elements 180. However, some supporting elements 180 are fluid-permeable, as illustrated in dashed lines, while other supporting elements 180 are fluid-impermeable, as illustrated in solid lines. Such a configuration may provide improved sound attenuation within sound-attenuating volumes 140.

FIGS. 4-6 illustrate first fluid stream 80 as flowing from left-to-right, or in a direction that is at least substantially perpendicular to a longitudinal axis of elongate cooling conduits 160 and/or to a longitudinal axis of sound-attenuating volumes 140. However, this illustration is for simplicity, and it is within the scope of the present disclosure that first fluid stream 80 may flow in any suitable direction along and/or across aerodynamically shaped surface 112. As an example, first fluid stream 80 may flow in a direction that is parallel, or at least substantially parallel, to the longitudinal axis of elongate cooling conduits 160 and/or to the longitudinal axis of sound-attenuating volumes 140. This may include flow into and/or out of the page in the illustrations of FIGS. 4-6.

Turning more specifically to FIG. 7, another example of sound-attenuating heat exchangers 100 that includes a plurality of sound-attenuating volumes 140 and a plurality of elongate cooling conduits 160 with triangular, or at least substantially triangular, transverse cross-sectional shapes is illustrated. In this embodiment, and similar to FIGS. 4-6, sound-attenuating volume 140 is defined between, or even completely by, aerodynamically shaped layer 110 and intermediate layer 130. However, and in contrast to the examples of FIGS. 4-6, cooled fluid containment body 150 is a cooled fluid containment layer 150 and elongate cooling conduits 160 are defined between, or even completely by, cooled fluid containment layer 150 and base 120. In addition, cooled fluid containment conduit 152 is defined between, or even completely by, cooled fluid containment layer 150 and intermediate layer 130. In the example of FIG. 7, and similar to FIGS. 4-6, cooled fluid containment body 150 may intersect, or contact, base 120 at a base intersection angle 136 and intermediate layer 130 may intersect, or contact, aerodynamically shaped layer 110 at an aerodynamically shaped layer intersection angle 138. Examples of base intersection angle 136 and/or of aerodynamically shaped layer intersection angle 138 are disclosed herein.

It is within the scope of the present disclosure that sound-attenuating heat exchangers 100 and/or the various components thereof may be formed from any suitable material and/or in any suitable manner. As examples, sound-attenuating heat exchangers 100 and/or any suitable portion thereof, including aerodynamically shaped layer 110, base 120, intermediate layer 130, and/or cooled fluid containment body 150 may be formed via machining and/or additive manufacturing and may be formed from one or more of a thermally conductive material, a thermoplastic, a thermoset, and/or a material that is compatible with additive manufacturing processes. As such, sound-attenuating heat exchangers 100 may be referred to herein as, may include, and/or may be a unitary structure that defines aerodynamically shaped layer 110, base 120, intermediate layer 130, and/or cooled fluid containment body 150.

Figure 8:
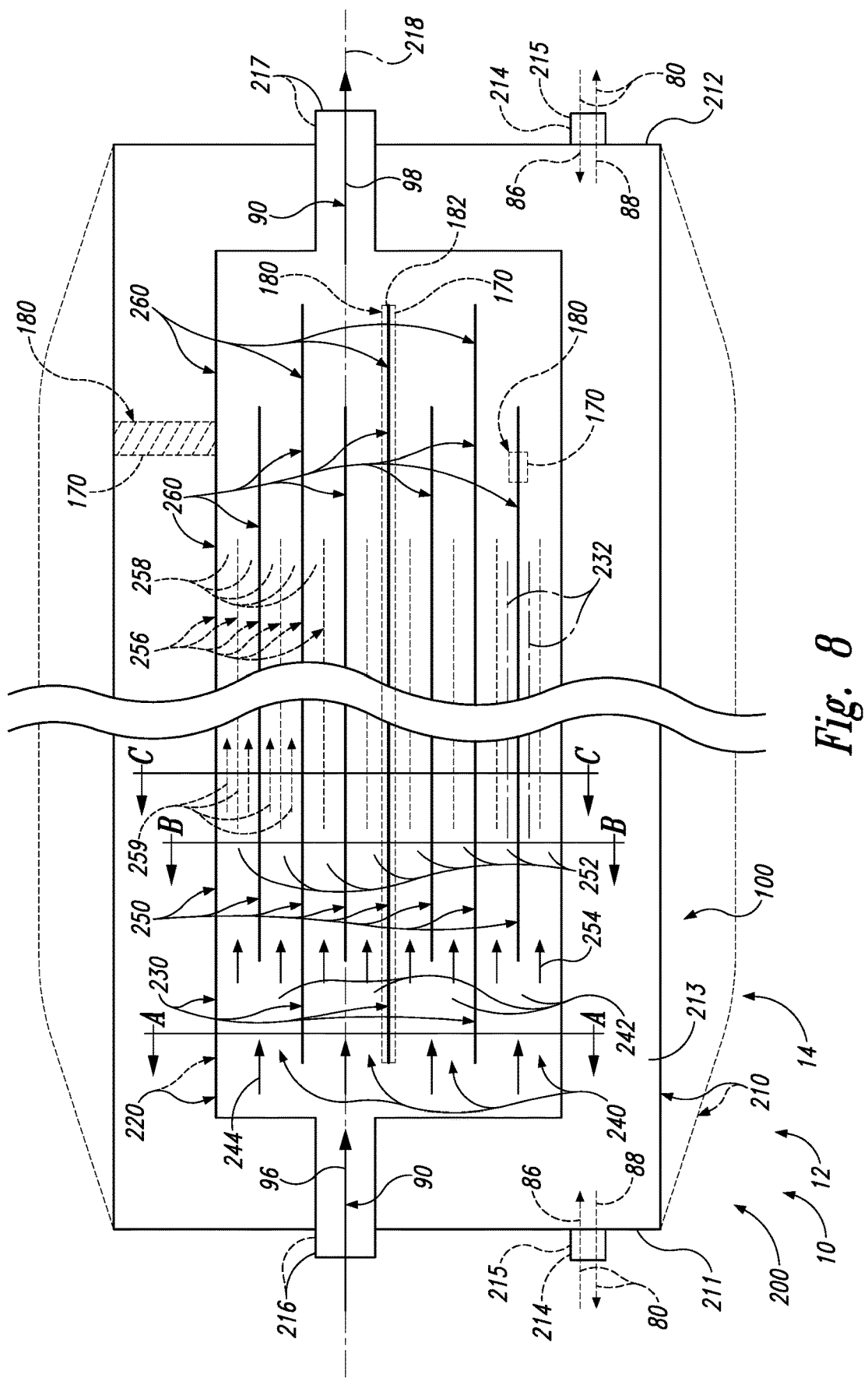
FIG. 8 is a schematic cross-sectional view illustrating examples of dendritic heat exchangers according to the present disclosure.
Figure 9:
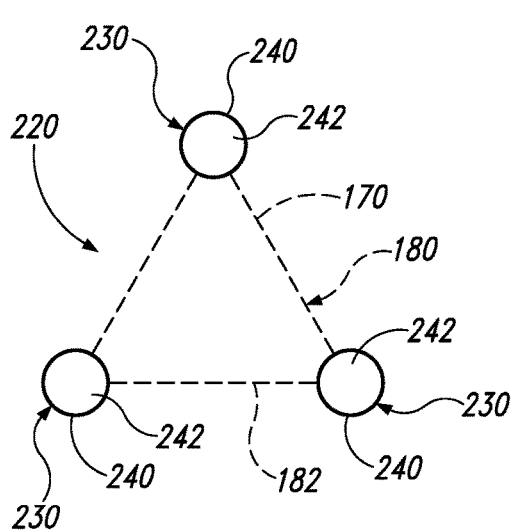
FIG. 9 is a less schematic transverse cross-sectional view of an example of the dendritic heat exchanger of FIG. 8 taken along line A-A of FIG. 8.
Figure 10:
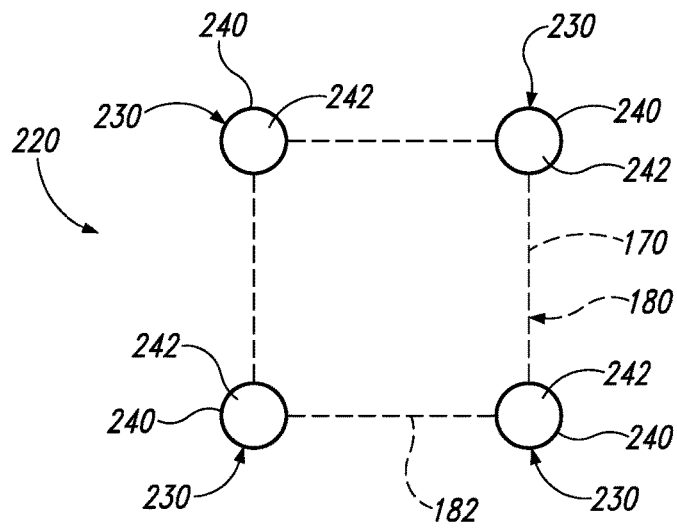
FIG. 10 is a less schematic transverse cross-sectional view of an example of the dendritic heat exchanger of FIG. 8 taken along line A-A of FIG. 8.
Figure 11:
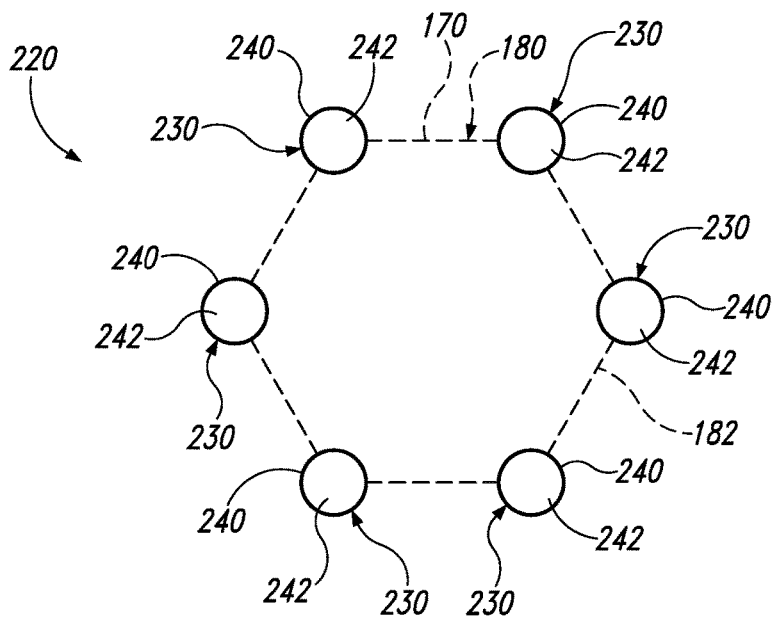
FIG. 11 is a less schematic transverse cross-sectional view of an example of the dendritic heat exchanger of FIG. 8 taken along line A-A of FIG. 8.
Figure 12:
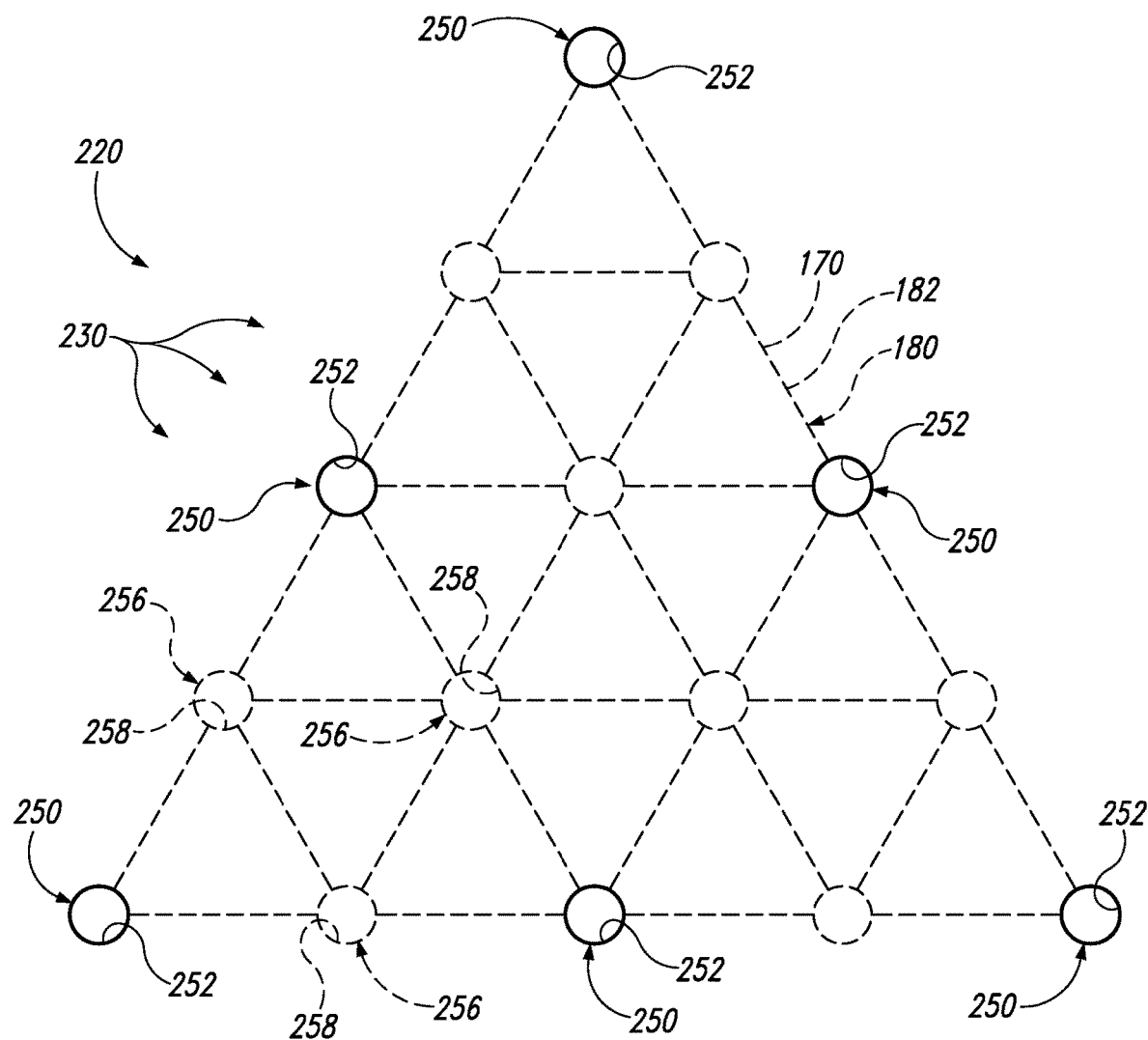
FIG. 12 is a less schematic transverse cross-sectional view of examples of the dendritic heat exchanger of FIG. 8 taken along line B-B of FIG. 8 (as illustrated in solid lines) and along line C-C of FIG. 8 (as illustrated in solid and dashed lines).
Figure 13:
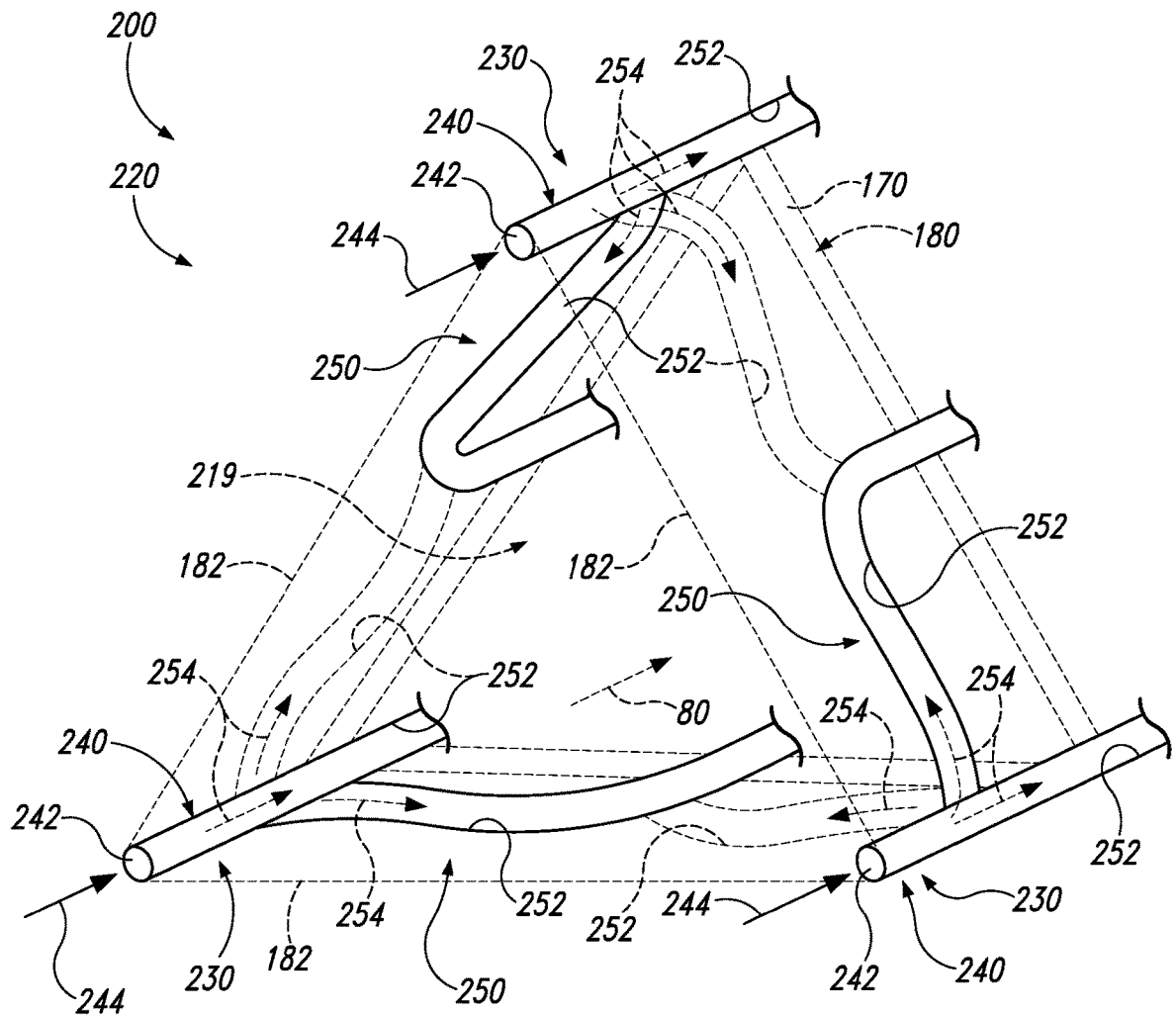
FIG. 13 is a less schematic profile view illustrating examples of dendritic heat exchangers according to the present disclosure.

FIG. 8 is a schematic cross-sectional view illustrating examples of dendritic heat exchangers 200 according to the present disclosure. FIGS. 9-11 are a less schematic transverse cross-sectional views of examples of dendritic heat exchangers 200 of FIG. 8 taken along line A-A of FIG. 8 and FIG. 12 is a less schematic transverse cross-sectional view of examples of dendritic heat exchangers 200 of FIG. 8 taken along line B-B of FIG. 8 (as illustrated in solid lines) and along line C-C of FIG. 8 (as illustrated in solid and in dashed lines). FIG. 13 is a less schematic profile view illustrating examples of dendritic heat exchangers 200 according to the present disclosure.

Dendritic heat exchangers 200 may be configured to exchange thermal energy between a first fluid stream 80 and a second fluid stream 90, as illustrated in FIG. 8. With continued reference to FIG. 8, dendritic heat exchangers 200 include an elongate housing 210 that may extend between a first end 211 and a second end 212 and defines a housing volume 213. Elongate housing 210 includes a first fluid inlet 214, a first fluid outlet 215, a second fluid inlet 216, and a second fluid outlet 217. First fluid inlet 214 is configured to receive first fluid stream 80 into housing volume 213 as a first fluid inlet stream 86, and first fluid outlet 215 is configured to emit first fluid stream 80 from housing volume 213 as a first fluid outlet stream 88. Similarly, second fluid inlet 216 is configured to receive second fluid stream 90 into housing volume 213 as a second fluid inlet stream 96, and second fluid outlet 217 is configured to emit second fluid stream 90 from housing volume 213 as a second fluid outlet stream 98. FIG. 8 illustrates first fluid inlet stream 86, first fluid outlet stream 88, first fluid inlet 214, and first fluid outlet 215 in dashed lines to indicate that dendritic heat exchangers 200 may be configured both for co-current and counter-current flow of first fluid stream 80 and second fluid stream 90.

Dendritic heat exchangers 200 also include a heat exchange structure 220 extending within housing volume 213, and various configurations for heat exchange structure 220 are illustrated by the examples of FIGS. 8-13. Heat exchange structure 220 may be referred to herein as being configured to receive second fluid inlet stream 96, to produce second fluid outlet stream 98, to flow second fluid stream 90 in heat exchange relationship with first fluid stream 80, and/or to maintain fluid separation between first fluid stream 80 and second fluid stream 90 within housing volume 213.

Heat exchange structure 220 includes a plurality of dendritic tubulars 230. Each dendritic tubular 230 includes an inlet region 240, as illustrated in FIGS. 8-11 and 13, and a branching region 250, as illustrated in FIGS. 8 and 12-13. Inlet region 240 defines an inlet conduit 242 configured to receive a portion 244 of second fluid stream 90 from second fluid inlet 216. Branching region 250 defines a plurality of branching conduits 252 that extends from inlet conduit 242. Each branching conduit 252 is configured to receive a respective fraction 254 of portion 244 of second fluid stream 90 from inlet conduit 242. In addition, each branching conduit 252 is configured to, directly or indirectly, provide respective fraction 254 to second fluid outlet 217 to at least partially define second fluid outlet stream 98.

Figure 15:
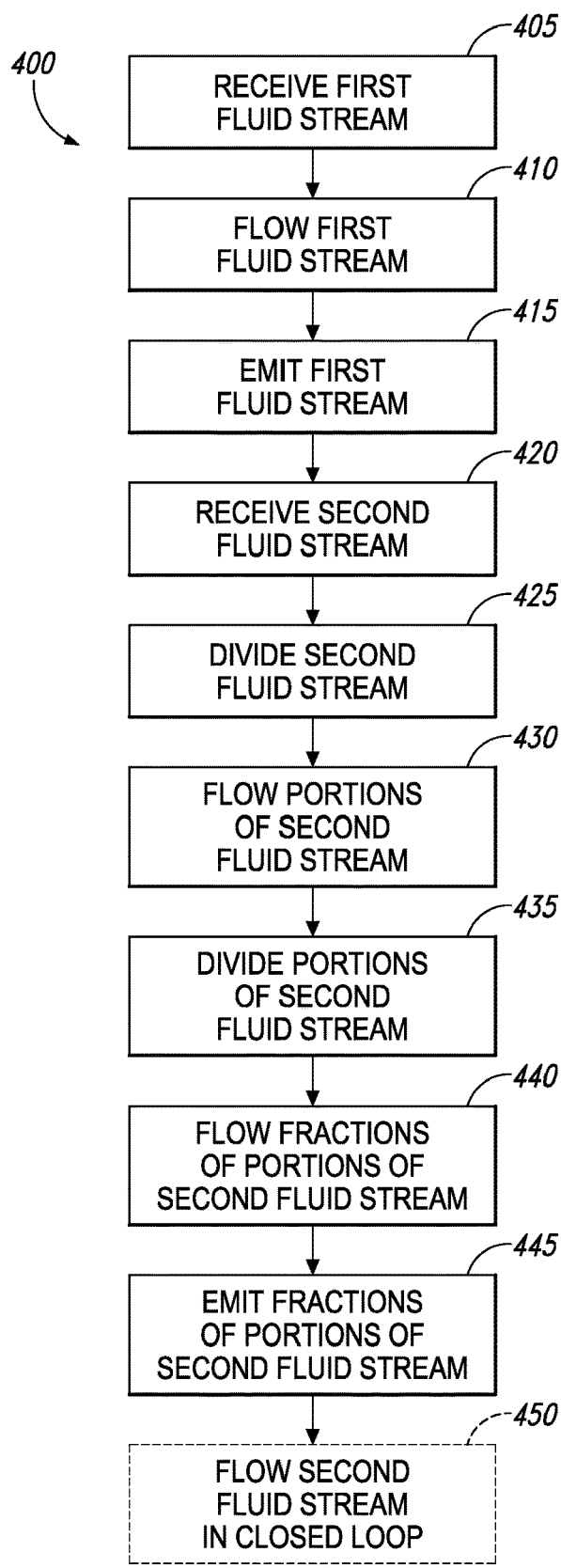
FIG. 15 is a flowchart depicting methods, according to the present disclosure, of exchanging heat in a dendritic heat exchanger.

During operation of dendritic heat exchangers 200, and as discussed in more detail herein with reference to methods 400 of FIG. 15, first fluid stream 80 may be received into housing volume 213 of elongate housing 210 via first fluid inlet 214. First fluid stream 80 may flow in heat exchange relationship with heat exchange structure 220 before being emitted from housing volume 213 via first fluid outlet 215. This may include flow of first fluid stream 80 into and/or around dendritic tubulars 230 of heat exchange structure 220. As such, first fluid stream 80 may be referred to herein as being separated and/or divided, within dendritic heat exchanger 200, into a plurality of sub-streams.

Concurrently, second fluid stream 90 may be received into heat exchange structure 220 via second fluid inlet 216 and may be separated and/or divided into a plurality of portions 244 of second fluid stream 90. Portions 244 may flow through corresponding inlet conduits 242 of corresponding dendritic tubulars 230 before being divided into respective fractions 254 of portion 244 of second fluid stream 90 within branching region 250. Fractions 254 may flow within corresponding branch conduits 252 of branching regions 250 before being emitted from dendritic heat exchanger 200 via second fluid outlet 217.

Flow of both first fluid stream 80 and second fluid stream 90 through corresponding regions of dendritic heat exchanger 200 may facilitate, or bring about, thermal exchange, or heat transfer, between the first fluid stream and the second fluid stream. The branching of dendritic tubulars 230 within dendritic heat exchanger 200 may increase a surface area for heat transfer between first fluid stream 80 and second fluid stream 90 when compared to conventional heat exchangers that do not include dendritic tubulars 230.

Dendritic tubulars 230 may include any suitable structure that may include and/or define inlet region 240, inlet conduit 242, branching region 250, and/or branching conduits 252. As an example, dendritic tubulars 230 may include and/or be elongate dendritic tubulars 230 and/or may extend between at least substantial fraction of a distance between first end 211 and second end 212 of elongate housing 210. As examples, dendritic tubulars 230 may extend at least 50%, at least 60%, at least 70%, at least 80%, at least 90%, and/or at least 95% of the distance between first end 211 and second end 212. As another example, dendritic tubulars 230 may extend along an elongate axis 218 of housing volume 213 and/or of elongate housing 210. As yet another example, each dendritic tubular 230 may extend along a corresponding tubular axis 232, and the corresponding tubular axis 232 of each dendritic tubular 230 may be parallel, or at least substantially parallel, to the corresponding tubular axis 232 of each other dendritic tubular 230.

As perhaps best illustrated in FIGS. 9-13, dendritic tubulars 230 may be spaced-apart from one another within housing volume 213. Such a configuration may permit and/or facilitate fluid flow between and/or around dendritic tubulars 230, thereby enhancing heat transfer therefrom.

Dendritic tubulars 230 may be arranged with any suitable spacing and/or relative orientation within a transverse cross-section of heat exchange structure 220. As an example, and as illustrated in FIGS. 9-13, dendritic tubulars 230 may be arranged in a patterned array and/or at vertices of a repeating geometric shape, at least a fraction of which may be illustrated by FIGS. 9-13. As another example, and as illustrated in FIGS. 9 and 12-13, dendritic tubulars 230 may be arranged at vertices of a triangle, which may increase a stiffness and/or strength of heat exchange structure 220. As additional examples, and as illustrated in FIG. 10, dendritic tubulars 230 may be arranged at vertices of a square or rectangle. As another example, and as illustrated in FIG. 11, dendritic tubulars may be arranged at vertices of a hexagon.

It is within the scope of the present disclosure that a transverse cross-sectional area of each branch conduit 252 may differ from, or may be less than, a transverse cross-sectional area of a corresponding inlet conduit that is in fluid communication with the branch conduits. Additionally or alternatively, a sum of the cross-sectional area of each branch conduit in the plurality of branch conduits may be within a threshold fraction of the transverse cross-sectional area of the inlet conduit. Examples of the threshold fraction include threshold fractions of at least 50%, at least 60%, at least 70%, at least 80%, at least 90%, at least 100%, at least 200%, at least 300%, at least 400%, at most 600%, at most 500%, at most 400%, at most 300%, at most 200%, at most 150%, at most 140%, at most 130%, at most 120%, at most 110%, and/or at most 100%. To accommodate, or provide space for, the branched nature of dendritic tubulars 230, elongate housing 210 may be bowed, may expand, and/or may increase in transverse cross-sectional area along a length thereof, as illustrated in dashed lines in FIG. 8.

As illustrated in dashed lines in FIGS. 8 and 12, branching region 250 may be a first branching region 250, branch conduits 252 may be first branch conduits 252, and dendritic tubulars 230 further may include a second branching region 256. Each second branching region 256, when present, extends from a corresponding first branch conduit 252 of a corresponding first branching region 250 and may include a plurality of second branch conduits 258. As an example, at least two second branch conduits 258 may extend from each first branch conduit 252. The at least two second branch conduits 258 may be configured to receive a respective sub-fraction 259 of fraction 254 of portion 244 of second fluid inlet stream 96 and to provide respective sub-fraction 259 to second fluid outlet 217 to at least partially define second fluid outlet stream 98.

Stated another way, dendritic tubulars 230 may include and/or define a plurality of subsequent branching regions that are downstream from branching region 250. Each subsequent branching region may be configured to receive a corresponding sub-fraction of respective fraction 254 of portion 244 of second fluid inlet stream 96 from an upstream branching region, or branch conduit thereof.

As illustrated in FIG. 8, it is also within the scope of the present disclosure that dendritic tubulars 230 may include one or more combining regions 260. Combining regions 260, when present, may be configured to receive respective fractions 254 of portions 244 of second fluid inlet stream 96 from at least two branch conduits 252 and to combine respective fractions 254 to at least partially define second fluid outlet stream 98. Combining regions 260 may be similarly shaped to, or may be mirror images of, branching regions 250.

Similar to sound-attenuating heat exchangers 100, which are disclosed herein, dendritic heat exchangers 200 may include heat transfer-enhancing structures 170 and/or supporting elements 180. Heat transfer-enhancing structures 170 may enhance heat transfer within dendritic heat exchangers 200, while supporting elements 180 may support heat exchange structure 220 and/or dendritic tubulars 230 thereof.

Heat transfer-enhancing structures 170 may extend from any suitable portion of dendritic heat exchangers 200, such as from elongate housing 210 and/or heat exchange structure 220. As more specific examples, heat transfer-enhancing structures 170 and/or supporting elements 180 may extend between elongate housing 210 and heat exchange structure 220, may extend between elongate housing 210 and dendritic tubulars 230, and/or may extend between corresponding pairs of dendritic tubulars 230.

Similar to supporting elements 180 of sound-attenuating heat exchangers 100, supporting elements 180 utilized within dendritic heat exchangers 200 may be porous, or fluid-permeable, may be fluid-impermeable, may be thermally conductive, and/or may function as heat transfer-enhancing structures 170. Supporting elements 180 that are fluid-impermeable also may be referred to herein as internal walls 182 and may extend between and/or along a length of, corresponding pairs of dendritic tubulars 230. Internal walls 182, when present, may define one or more first fluid conduits 219, which may direct flow of first fluid stream 80 within dendritic heat exchangers 200, as illustrated in FIG. 13.

With continued reference to FIG. 13, a more specific example of dendritic heat exchangers 200, according to the present disclosure, is illustrated. Dendritic heat exchanger 200 of FIG. 13 may be formed via an additive manufacturing process; however, this is not required. As illustrated in FIG. 13, inlet conduits 242 of dendritic tubulars 230 may branch or separate, within corresponding branching regions 250, into two or more branch conduits 252. As discussed herein, this branching may occur any suitable number of times and may divide portion 244 of second fluid stream 90 into corresponding fractions 254. As illustrated in FIG. 13, branch regions 250 may extend from corresponding inlet regions 240 in a smooth, continuous, and/or arcuate manner. This may include extending at a branch conduit angle 253, examples of which include obtuse branch conduit angles and/or branch conduit angles of at least 100 degrees, at least 110 degrees, at least 120 degrees, at least 130 degrees, at least 140 degrees, at most 170 degrees, at most 160 degrees, at most 150 degrees, at most 140 degrees, at most 130 degrees, and/or at most 120 degrees. As also illustrated in FIG. 13, this branching may cause dendritic heat exchangers 200 to exhibit a regular and/or repeating transverse cross-sectional pattern for dendritic tubulars 230 thereof, with this cross-sectional pattern becoming more and more finely distributed with increase branching, such as is illustrated in FIG. 12.

It is within the scope of the present disclosure that dendritic heat exchangers 200 and/or the various components thereof may be formed from any suitable material and/or in any suitable manner. As examples, dendritic heat exchangers 200 and/or any suitable portion thereof, including elongate housings 210, heat exchange structures 220, and/or dendritic tubulars 230 may be formed via machining and/or additive manufacturing and may be formed from one or more of a thermally conductive material and/or a material that is compatible with additive manufacturing processes. As such, dendritic heat exchangers 200 may be referred to herein as, may include, and/or may be a unitary structure that defines elongate housing 210, heat exchange structure 220, and/or dendritic tubulars 230.

Dendritic heat exchangers 200 have been described herein as exchanging thermal energy between first fluid stream 80 and second fluid stream 90. It is within the scope of the present disclosure that dendritic heat exchangers 200 may exchange thermal energy between first fluid stream 80 and a plurality of distinct second fluid streams 90. In such a configuration, at least one dendritic tubular 230 of heat exchange structure 220 may receive each second fluid stream of the plurality of distinct second fluid streams; and heat exchange structure 220 may maintain fluid isolation among the plurality of distinct second fluid streams. Additionally or alternatively, and as illustrated in dashed lines in FIG. 8, dendritic heat exchangers 200 may include a plurality of heat exchange structures 220, with each heat exchange structure 220 receiving a corresponding second fluid stream of the plurality of second fluid streams. Regardless of the exact configuration, when dendritic heat exchangers 200 exchange thermal energy between first fluid stream 80 and the plurality of distinct second fluid streams 90, the dendritic heat exchangers may include a plurality of second fluid inlets 216 and/or a plurality of second fluid outlets 217, as illustrated in dashed lines in FIG. 8.

It is within the scope of the present disclosure that any of the components, structures, and/or features, which are disclosed herein with reference to dendritic heat exchangers 200, may be included in and/or utilized with sound-attenuating heat exchangers 100. Similarly, it is also within the scope of the present disclosure that any of the components, structures, and/or features, which are disclosed herein with reference to sound-attenuating heat exchangers 100 may be included in and/or utilized with dendritic heat exchangers 200.

As an example, sound-attenuating heat exchangers 100, according to the present disclosure, may include and/or utilize intermediate layer 130 and base 120 to form and/or define elongate housing 210 of dendritic heat exchangers 200. As another example, cooled fluid containment body 150 of sound-attenuating heat exchangers 100, according to the present disclosure, may define at least a portion of heat exchange structure 220 of dendritic heat exchangers 200. As yet another example, sound-attenuating heat exchangers 100, according to the present disclosure, may utilize elongate cooling conduit 160 as housing volume 213 of dendritic heat exchangers 200. As another example, sound-attenuating heat exchangers 100, according to the present disclosure, may utilize cooled fluid containment body 150 to define dendritic tubulars 230 of dendritic heat exchangers 200. As a more specific example, and with reference to FIGS. 4-6, cooled fluid containment tubulars 151 may be dendritic, or may include any suitable structure, function, and/or feature of dendritic tubulars 230 of FIGS. 8-13.

FIG. 14 is a flowchart depicting methods 300, according to the present disclosure, of exchanging heat and attenuating sound within a sound-attenuating heat exchanger. Methods 300 include flowing a first fluid stream at 310, receiving a sound wave at 320, attenuating the sound wave at 330, and receiving a cooled stream at 340. Methods 300 may include flowing the cooled stream in a closed loop at 350 and also include receiving a cooling stream at 360 and maintaining fluid separation at 370.

Flowing the first fluid stream at 310 may include flowing the first fluid stream, which includes a first fluid, across an aerodynamically shaped surface. The aerodynamically shaped surface may be defined by an aerodynamically shaped layer of the sound-attenuating heat exchanger, such as aerodynamically shaped layer 110 of FIGS. 3-7. Examples of the first fluid are disclosed herein.

Receiving the sound wave at 320 may include receiving the sound wave that propagates within the first fluid stream into a sound-attenuating volume of the sound-attenuating heat exchanger. The receiving at 320 may be concurrent with, based upon, and/or a result of the flowing at 310.

The sound-attenuating volume may be at least partially defined by the aerodynamically shaped layer, and the receiving at 320 may include receiving the sound wave via a plurality of apertures defined within the aerodynamically shaped layer. Examples of the sound-attenuating volume are disclosed herein with reference to sound-attenuating volume 140 of FIGS. 3-7. Examples of the apertures are disclosed herein with reference to apertures 116 of FIGS. 3-7.

Attenuating the sound wave at 330 may include attenuating the sound wave within the sound-attenuating volume. The attenuating at 330 may be concurrent with, based upon, and/or a result of the flowing at 310 and/or the receiving at 320.

As discussed herein, the sound-attenuating volume may form and/or define a Helmholtz resonator that may be configured to attenuate the sound wave. As an example, and as also discussed herein, the sound-attenuating volume may be configured such that the sound wave travels a distance, within the sound-attenuating volume, that is at least substantially equal to a wavelength of the sound wave.

Receiving the cooled stream at 340 may include receiving the cooled stream that includes a second fluid. The second fluid may be separate from, may be distinct from, and/or may be fluidly isolated from the first fluid. Examples of the second fluid are disclosed herein, and the receiving at 340 may be concurrent with the flowing at 310, the attenuating at 320, and/or the attenuating at 330.

The receiving at 340 may include receiving the cooled stream with a cooled fluid containment conduit. The cooled fluid containment conduit may be at least partially defined by a cooled fluid containment body of the sound-attenuating heat exchanger. Examples of the cooled fluid containment conduit are disclosed herein with reference to cooled fluid containment conduit 152 of FIGS. 3-7. Examples of the cooled fluid containment body are disclosed herein with reference to cooled fluid containment body 150 and/or cooled fluid containment tubulars 151 of FIGS. 3-7.

Flowing the cooled stream in the closed loop at 350 may include flowing the cooled stream in the closed loop within a system, such as an aircraft and/or a jet engine of the aircraft, to cool a cooled component of the system. Stated another way, the cooled stream may be contained and/or retained within the system, and the flowing at 350 may include circulating the cooled stream within the system, such as to cool the cooled component with, via, and/or utilizing the cooled stream.

Receiving the cooling stream at 360 may include receiving the cooling stream, which includes the first fluid, into an elongate cooling conduit that is at least partially defined by a base of the sound-attenuating heat exchanger. The receiving at 360 may be concurrent with, based upon, and/or a result of the flowing at 310. As an example, the receiving at 360 may include separating the cooling stream from a remainder of the first fluid stream at a cooling conduit inlet of the elongate cooling conduit. The receiving at 360 additionally or alternatively may be concurrent with the receiving at 320, the attenuating at 330, the receiving at 340, and/or the flowing at 350.

The receiving at 360 may include receiving the cooling stream in, or into, heat exchange relationship with the cooled fluid containment body, such as to cool the cooled fluid containment body and/or the cooled stream with the cooling stream. Examples of the elongate cooling conduit are disclosed herein with reference to elongate cooling conduit 160 of FIGS. 3-7. Examples of the cooling conduit inlet are disclosed herein with reference to cooling conduit inlet 162 of FIG. 3. Examples of the base are disclosed herein with reference to base 120 of FIGS. 3-7.

As discussed herein, the sound-attenuating heat exchanger may be utilized in a system, such as an aircraft and/or a jet engine of the aircraft. Under these conditions, the receiving at 360 may include receiving a compressed air stream from a fan of the jet engine of the aircraft.

Maintaining fluid separation at 370 may include maintaining fluid separation between the cooling stream and the cooled stream within the sound-attenuating heat exchanger. The maintaining at 370 may be accomplished in any suitable manner. As an example, the cooled fluid containment body may at least partially, or even completely, fluidly isolate the cooling stream and the cooled stream within the sound-attenuating heat exchanger.

FIG. 15 is a flowchart depicting methods 400, according to the present disclosure, of exchanging heat in a dendritic heat exchanger. Methods 400 include receiving a first fluid stream at 405, flowing the first fluid stream at 410, and emitting the first fluid stream at 415. Methods 400 also include receiving a second fluid stream at 420, dividing the second fluid stream at 425, flowing portions of the second fluid stream at 430, and dividing the portions of the second fluid stream at 435. Methods 400 further include flowing fractions of the portions of the second fluid stream at 440 and emitting the fractions of the portions of the second fluid stream at 445. Methods 400 also may include flowing the second fluid stream in a closed loop at 450.

Receiving the first fluid stream at 405 may include receiving the first fluid stream into a housing volume of the dendritic heat exchanger. This may include receiving the first fluid stream as a first fluid inlet stream and/or receiving the first fluid stream into the housing volume via a first fluid inlet of an elongate housing that defines the housing volume. As discussed herein, the dendritic heat exchanger may be utilized within an aircraft and/or within a jet engine of the aircraft. Under these conditions, the receiving at 405 may include receiving a compressed air stream from the jet engine.

Examples of the first fluid stream are disclosed herein. Examples of the elongate housing are disclosed herein with reference to elongate housing 210 of FIG. 8. Examples of the housing volume are disclosed herein with reference to housing volume 213 of FIG. 8. Examples of the first fluid inlet are disclosed herein with reference to first fluid inlet 214 of FIG. 8.

Flowing the first fluid stream at 410 may include flowing the first stream within the housing volume. This may include flowing the first stream in heat exchange relationship with a heat exchange structure that extends, or is positioned, within the housing volume. The flowing at 410 may be concurrent with, based upon, and/or a result of the receiving at 405. Examples of the heat exchange structure are disclosed herein with reference to heat exchange structure 220 of FIGS. 8-13.

Emitting the first fluid stream at 415 may include emitting the first fluid stream from the housing volume. This may include emitting the first fluid stream, as a first fluid outlet stream, from a first fluid outlet of the elongate housing. The emitting at 415 may be concurrent with, based upon, and/or a result of the receiving at 405 and/or the flowing at 410. Examples of the first fluid outlet are disclosed herein with reference to first fluid outlet 215 of FIG. 8.

Receiving the second fluid stream at 420 may include receiving the second fluid stream into the heat exchange structure as a second fluid inlet stream. This may include receiving the second fluid stream with, via, and/or utilizing a second fluid inlet of the elongate housing. As discussed, the dendritic heat exchanger may be utilized within the aircraft and/or within the jet engine. Under these conditions, the receiving at 420 may include receiving the second fluid stream from a cooled component of the jet engine and/or of the aircraft.

The receiving at 420 may be concurrent with the receiving at 405, the flowing at 410, and/or the emitting at 415. Examples of the second fluid inlet are disclosed herein with reference to second fluid inlet 216 of FIG. 8.

Dividing the second fluid stream at 425 may include dividing the second fluid stream, or the second fluid inlet stream, into a plurality of portions of the second fluid inlet stream. This may include dividing the second fluid stream within the heat exchange structure and/or dividing the second fluid stream with, via, and/or utilizing a plurality of dendritic tubulars of the heat exchange structure. The dividing at 425 may be concurrent with the receiving at 405, the flowing at 410, the emitting at 415, and/or the receiving at 420. The dividing at 425 also may be based upon, responsive to, and/or a result of the receiving at 420. Examples of the plurality of portions of the second fluid stream are disclosed herein with reference to portions 244 of FIGS. 8 and 13. Examples of the dendritic tubulars are disclosed herein with reference to dendritic tubulars 230 of FIGS. 8-13.

Flowing the portions of the second fluid stream at 430 may include flowing each portion in the plurality of portions of the second fluid stream within a corresponding inlet conduit of a corresponding inlet conduit of a corresponding dendritic tubular of the plurality of dendritic tubulars. The flowing at 430 may be concurrent with the receiving at 405, the flowing at 410, the emitting at 415, the receiving at 420, and/or the dividing at 425. The flowing at 430 also may be based upon, responsive to, and/or a result of the receiving at 420 and/or the dividing at 425. Examples of the inlet conduit are disclosed herein with reference to inlet conduits 242 of inlet regions 240 of FIGS. 8-11 and 13.

Dividing the portions of the second fluid stream at 435 may include dividing each portion of the plurality of portions of the second fluid stream into a plurality of respective fractions. This may include dividing with, via, and/or utilizing a branching region of each dendritic tubular. The dividing at 435 may be concurrent with the receiving at 405, the flowing at 410, the emitting at 415, the receiving at 420, the dividing at 425, and/or the flowing at 430. The dividing at 435 also may be based upon, responsive to, and/or a result of the receiving at 420, the dividing at 425, and/or the flowing at 430. Examples of the branching region are disclosed herein with reference to branching regions 250 of FIGS. 8 and 12-13.

Flowing fractions of the portions of the second fluid stream at 440 may include flowing the fractions within a plurality of corresponding branch conduits of each dendritic tubular. The branch conduits may be formed and/or defined by the branching region of the dendritic tubular. The flowing at 440 may be concurrent with the receiving at 405, the flowing at 410, the emitting at 415, the receiving at 420, the dividing at 425, the flowing at 430, and/or the dividing at 435. The flowing at 440 also may be based upon, responsive to, and/or a result of the receiving at 420, the dividing at 425, the flowing at 430, and/or the dividing at 435. Examples of the branch conduit are disclosed herein with reference to branching conduits 252 of FIGS. 8 and 12-13.

Emitting the fractions of the portions of the second fluid stream at 445 may include emitting the fractions from the housing volume via a second fluid outlet of the elongate housing. This may include emitting the fractions as a second fluid outlet stream that flows from the dendritic heat exchanger. It is within the scope of the present disclosure that the emitting at 445 may include combining the fractions within the second fluid outlet and/or within one or more combining regions of the dendritic tubulars. The emitting at 445 may be concurrent with the receiving at 405, the flowing at 410, the emitting at 415, the receiving at 420, the dividing at 425, the flowing at 430, the dividing at 435, and/or the flowing at 440. The emitting at 445 also may be based upon, responsive to, and/or a result of the receiving at 420, the dividing at 425, the flowing at 430, the dividing at 435, and/or the flowing at 440. Examples of the second fluid outlet are disclosed herein with reference to second fluid outlet 217 of FIG. 8. Examples of the second fluid outlet stream are disclosed herein with reference to second fluid outlet stream 98 of FIG. 8. Examples of the combining regions are disclosed herein with reference to combining regions 260 of FIG. 8.

Flowing the second fluid stream in a closed loop at 450 may include flowing the second fluid stream in the closed loop within a system, such as an aircraft and/or a jet engine of the aircraft, to cool a cooled component of the system. Stated another way, the second fluid stream may be contained and/or retained within the system, and the flowing at 450 may include circulating the second fluid stream within the system, such as to cool the cooled component with, via, and/or utilizing the first fluid stream.

Illustrative, non-exclusive examples of inventive subject matter according to the present disclosure are described in the following enumerated paragraphs:

A1. A sound-attenuating heat exchanger, comprising:
an aerodynamically shaped layer;
a base;
an intermediate layer extending at least partially between the aerodynamically shaped layer and the base; and
a cooled fluid containment body;
wherein:
(i) the aerodynamically shaped layer defines an aerodynamically shaped surface, which is shaped to direct the flow of a first fluid stream that includes a first fluid, an opposed intermediate layer-facing surface, which faces toward the intermediate layer, and a plurality of apertures;
(ii) the intermediate layer defines a shaped layer-facing surface, which faces toward the aerodynamically shaped layer, and an opposed base-facing surface, which faces toward the base;
(iii) the base defines a base surface, which faces toward the intermediate layer;
(iv) the intermediate layer-facing surface of the aerodynamically shaped layer at least partially defines a sound-attenuating volume that is configured to be in fluid communication with the first fluid stream, via the plurality of apertures, and is configured to attenuate sound within the first fluid stream;
(v) the base surface of the base at least partially defines an elongate cooling conduit that extends between a cooling conduit inlet and a cooling conduit outlet and is configured to receive a cooling stream, which includes the first fluid, in a heat exchange relationship with the cooled fluid containment body;
(vi) the sound-attenuating volume is distinct from the elongate cooling fluid conduit and the intermediate layer at least partially fluidly isolates the sound-attenuating volume from the elongate cooling fluid conduit; and
(vii) the cooled fluid containment body at least partially defines a cooled fluid containment conduit that extends between a cooled fluid containment conduit inlet and a cooled fluid containment conduit outlet and is configured to receive a cooled stream that includes a second fluid.

A2. The sound-attenuating heat exchanger of paragraph A1, wherein the cooled fluid containment body is a cooled fluid containment layer, and further wherein the cooled fluid containment conduit is defined between the cooled fluid containment layer and the intermediate layer.

A3. The sound-attenuating heat exchanger of paragraph A2, wherein the sound-attenuating volume is defined between, and optionally by, the aerodynamically shaped layer and the intermediate layer.

A4. The sound-attenuating heat exchanger of any of paragraphs A2-A3, wherein the elongate cooling conduit is defined between, and optionally by, the cooled fluid containment layer and the base.

A5. The sound-attenuating heat exchanger of any of paragraphs A2-A4, wherein the cooled fluid containment layer contacts the base at a base intersection angle, wherein the base intersection angle is measured within the elongate cooling conduit and transverse to a longitudinal axis of the elongate cooling conduit, and optionally wherein the base intersection angle is at least one of:
(i) at least 30 degrees;
(ii) at least 35 degrees;
(iii) at least 40 degrees;
(iv) at least 45 degrees;
(v) at most 60 degrees;
(vi) at most 55 degrees;
(vii) at most 50 degrees;
(viii) at most 45 degrees; and
(ix) at least substantially equal to 45 degrees.

A6. The sound-attenuating heat exchanger of any of paragraphs A1-A5, wherein the intermediate layer contacts the aerodynamically shaped layer at an aerodynamically shaped layer intersection angle, wherein the aerodynamically shaped layer intersection angle is measured within the sound-attenuating volume and transverse to a/the longitudinal axis of the elongate cooling conduit, and optionally wherein the aerodynamically shaped layer intersection angle is at least one of:
(i) at least 30 degrees;
(ii) at least 35 degrees;
(iii) at least 40 degrees;
(iv) at least 45 degrees;
(v) at most 60 degrees;
(vi) at most 55 degrees;
(vii) at most 50 degrees;
(viii) at most 45 degrees; and
(ix) at least substantially equal to 45 degrees.

A6.1 The sound-attenuating heat exchanger of any of paragraphs A1-A6, wherein the sound-attenuating heat exchanger at least one of:
(i) includes a unitary structure that defines at least the aerodynamically shaped layer, the base, the intermediate layer, and the cooled fluid containment body; and
(ii) is formed via additive manufacturing.

A7. The sound-attenuating heat exchanger of any of paragraphs A1-A6.1, wherein the sound-attenuating volume is defined between, and optionally by, the aerodynamically shaped layer and the intermediate layer, and further wherein the elongate cooling conduit is defined between, and optionally by, the intermediate layer and the base.

A8. The sound-attenuating heat exchanger of paragraph A7, wherein the intermediate layer contacts the base at a base intersection angle, wherein the base intersection angle is measured within the elongate cooling conduit and transverse to a/the longitudinal axis of the elongate cooling conduit, and optionally wherein the base intersection angle is at least one of:
(i) at least 30 degrees;
(ii) at least 35 degrees;
(iii) at least 40 degrees;
(iv) at least 45 degrees;
(v) at most 60 degrees;
(vi) at most 55 degrees;
(vii) at most 50 degrees;
(viii) at most 45 degrees; and
(ix) at least substantially equal to 45 degrees.

A9. The sound-attenuating heat exchanger of any of paragraphs A7-A8, wherein the intermediate layer contacts the aerodynamically shaped layer at an/the aerodynamically shaped layer intersection angle, wherein the aerodynamically shaped layer intersection angle is measured within the sound-attenuating volume and transverse to a/the longitudinal axis of the elongate cooling conduit, and optionally wherein the base intersection angle is at least one of:
(i) at least 30 degrees;
(ii) at least 35 degrees;
(iii) at least 40 degrees;
(iv) at least 45 degrees;
(v) at most 60 degrees;
(vi) at most 55 degrees;
(vii) at most 50 degrees;
(viii) at most 45 degrees; and
(ix) at least substantially equal to 45 degrees.

A10. The sound-attenuating heat exchanger of any of paragraphs A7-A9, wherein the cooled fluid containment body includes a cooled fluid containment tubular, and optionally a plurality of distinct cooled fluid containment tubulars, that extends within an elongate cooling conduit.

A11. The sound-attenuating heat exchanger of paragraph A10, wherein the sound-attenuating heat exchanger further includes a plurality of supporting elements that extends between the cooled fluid containment tubular and at least one of the intermediate layer and the base.

A12. The sound-attenuating heat exchanger of any of paragraphs A7-A11, wherein the cooled fluid containment tubular is a first cooled fluid containment tubular, and further wherein the sound-attenuating heat exchanger includes a second cooled fluid containment tubular, and optionally a plurality of distinct second cooled fluid containment tubulars, that extends within the sound-attenuating volume.

A13. The sound-attenuating heat exchanger of paragraph A12, wherein the sound-attenuating heat exchanger further includes a plurality of second supporting elements that extends between the second cooled fluid containment tubular and at least one of the intermediate layer and the aerodynamically shaped layer.

A14. The sound-attenuating heat exchanger of paragraph A13, wherein at least a subset of the plurality of second supporting elements is fluid-permeable.

A15. The sound-attenuating heat exchanger of any of paragraphs A13-A14, wherein at least a subset of the plurality of second supporting elements is fluid-impermeable.

A16. The sound-attenuating heat exchanger of any of paragraphs A1-A15, wherein a transverse cross-sectional shape of at least one of the sound-attenuating volume and the elongate cooling conduit, as measured transverse to an/the longitudinal axis of the elongate cooling conduit, is at least one of:
(i) triangular;
(ii) at least substantially triangular;
(iii) isosceles triangular;
(iv) at least substantially isosceles triangular;
(v) rectangular; and
(vi) at least substantially rectangular.

A17. The sound-attenuating heat exchanger of any of paragraphs A1-A16, wherein an average distance between the intermediate layer-facing surface of the aerodynamically shaped layer and the base surface of the base layer is less than a threshold fraction of a maximum extent of the aerodynamically shaped surface of the aerodynamically shaped layer, optionally wherein the threshold fraction of the maximum extent of the aerodynamically shaped surface is less than 25%, less than 20%, less than 15%, less than 10%, less than 5%, less than 2.5%, or less than 1%.

A18. The sound-attenuating heat exchanger of any of paragraphs A1-A17, wherein an/the average distance between the intermediate layer-facing surface of the aerodynamically shaped layer and the base surface of the base layer is less than a threshold fraction of a minimum extent of the aerodynamically shaped surface of the aerodynamically shaped layer, optionally wherein the threshold fraction of the minimum extent of the aerodynamically shaped surface is less than 25%, less than 20%, less than 15%, less than 10%, less than 5%, less than 23%, or less than 1%.

A19. The sound-attenuating heat exchanger of any of paragraphs A1-A18, wherein the sound-attenuating volume defines a Helmholtz resonator.

A20. The sound-attenuating heat exchanger of any of paragraphs A1-A19, wherein the sound-attenuating volume is configured to receive sound waves from the first fluid stream via the apertures and to attenuate the sound waves therewithin.

A21. The sound-attenuating heat exchanger of any of paragraphs A1-A20, wherein the sound-attenuating volume is configured to receive sound waves from the first fluid stream via the apertures, and further wherein a travel distance for the sound waves, within the sound-attenuating volume, is at least substantially equal to twice a wavelength of a target sound wave attenuated frequency.

A22. The sound-attenuating heat exchanger of any of paragraphs A1-A21, wherein the sound-attenuating heat exchanger further includes a plurality of heat transfer-enhancing structures configured to enhance heat transfer between the cooled stream and the cooling stream.

A23. The sound-attenuating heat exchanger of paragraph A22, wherein the plurality of heat transfer-enhancing structures includes at least one of:
(i) a plurality of projections;
(ii) a plurality of pins;
(iii) a plurality of posts; and
(iv) a plurality of fins.

A24. The sound-attenuating heat exchanger of any of paragraphs A22-A23, wherein at least a subset of the plurality of heat transfer-enhancing structures at least one of:
  (i) projects from the intermediate layer-facing surface of the aerodynamically shaped layer and within the sound-attenuating volume;
  (ii) projects from the shaped layer-facing surface of the intermediate layer and within the sound-attenuating volume;
  (iii) projects from the base-facing surface of the intermediate layer and within the elongate cooling conduit;
  (iv) projects from the base surface of the base layer and within the elongate cooling conduit; and
  (v) projects from the cooled fluid containment body and within the elongate cooling conduit.

A25. The sound-attenuating heat exchanger of any of paragraphs A1-A24, wherein the sound-attenuating heat exchanger includes a plurality of distinct sound-attenuating volumes.

A26. The sound-attenuating heat exchanger of any of paragraphs A1-A25, wherein the sound-attenuating heat exchanger includes a plurality of distinct elongate cooling conduits.

A27. The sound-attenuating heat exchanger of any of paragraphs A1-A26, wherein the first fluid includes air, and optionally ambient air.

A28. The sound-attenuating heat exchanger of any of paragraphs A1-A27, wherein the second fluid includes at least one of:
  (i) a heat transfer fluid;
  (ii) a heat transfer liquid; and
  (iii) an oil.

A29. A jet engine installation, comprising:
  a fan;
  a fan housing;
  a turbine assembly mechanically coupled to, and configured to rotate with, the fan;
  a turbine housing at least partially surrounding the turbine assembly and defining a housing aerodynamically shaped surface;
  a nacelle at least partially surrounding the fan, the turbine, and the turbine housing and defining a nacelle aerodynamically shaped surface; and
  the sound-attenuating heat exchanger of any of paragraphs A1-A28, wherein the aerodynamically shaped surface of the sound-attenuating heat exchanger forms at least a portion of at least one of the housing aerodynamically surface and the nacelle aerodynamically shaped surface.

A30. An aircraft including the jet engine of paragraph A29.

A31. The aircraft of paragraph A30, wherein the sound-attenuating heat exchanger forms a portion of a heat transfer system, and further wherein the second fluid flows within a closed loop within the heat transfer system.

A32. A sound-attenuating heat exchanger, comprising:
  any suitable structure of any sound-attenuating heat exchanger of any of paragraphs A1-A28; and
  any suitable structure of any of the dendritic heat exchangers of any of paragraphs B1-B26.

A33. The sound-attenuating heat exchanger of paragraph A32, wherein at least one of:
  (i) the intermediate layer and the base layer of any of paragraphs A1-A28 together define the elongate housing of any of paragraphs B1-B26; and
  (ii) the intermediate layer and the aerodynamically shaped layer of any of paragraphs A1-A28 together define the elongate housing of any of paragraphs B1-B26.

A34. The sound-attenuating heat exchanger of any of paragraphs A32-A33, wherein the cooled fluid containment body of any of paragraphs A1-A28 defines the heat exchange structure of any of paragraphs B1-B26.

A35. The sound-attenuating heat exchanger of any of paragraphs A32-A34, wherein the elongate cooling conduit of any of paragraphs A1-A28 defines, or is instead, the housing volume of any of paragraphs B1-B26.

A36. The sound-attenuating heat exchanger of any of paragraphs A32-A35, wherein the cooled fluid containment body of any of paragraphs A1-A28 is defined by, or is instead, the plurality of dendritic tubulars of any of paragraphs B1-B26.

B1. A dendritic heat exchanger configured to exchange thermal energy between a first fluid stream and a second fluid stream, the dendritic heat exchanger comprising:
  an elongate housing extending between a first end and an opposed second end and defining:
    (i) a housing volume;
    (ii) a first fluid inlet configured to receive the first fluid stream, as a first fluid inlet stream, into the housing volume;
    (iii) a first fluid outlet configured to emit the first fluid stream, as a first fluid outlet stream, from the housing volume;
    (iv) a second fluid inlet configured to receive the second fluid stream, as a second fluid inlet stream, into the housing volume; and
    (v) a second fluid outlet configured to emit the second fluid stream, as a second fluid outlet stream, from the housing volume; and
  a heat exchange structure extending within the housing volume, wherein the heat exchange structure includes a plurality of dendritic tubulars, and further wherein each dendritic tubular in the plurality of dendritic tubulars includes:
    (i) an inlet region defining an inlet conduit configured to receive a portion of the second fluid inlet stream from the second fluid inlet; and
    (ii) a branching region defining a plurality of branch conduits that extends from the inlet conduit, wherein each branch conduit in the plurality of branch conduits is configured to receive a respective fraction of the portion of the second fluid inlet stream from the inlet conduit and to provide the respective fraction of the portion of the second fluid inlet stream to the second fluid outlet to at least partially define the second fluid outlet stream.

B2. The dendritic heat exchanger of paragraph B1, wherein the heat exchange structure is configured to receive the second fluid inlet stream.

B3. The dendritic heat exchanger of any of paragraphs B1-B2, wherein the heat exchange structure is configured to produce the second fluid outlet stream.

B4. The dendritic heat exchanger of any of paragraphs B1-B3, wherein the heat exchange structure is configured to flow the second fluid stream, within the housing volume, in heat exchange relationship with the first fluid stream.

B5. The dendritic heat exchanger of any of paragraphs B1-B4, wherein the heat exchange structure is configured to maintain fluid separation between the first fluid stream and the second fluid stream within the housing volume.

B6. The dendritic heat exchanger of any of paragraphs B1-B5, wherein a transverse cross-sectional area of each branch conduit in the plurality of branch conduits is less than a transverse cross-sectional area of the inlet conduit.

B7. The dendritic heat exchanger of paragraph B6, wherein a sum of the transverse cross-sectional area of each branch conduit in the plurality of branch conduits is within a threshold fraction of the transverse cross-sectional area of the inlet conduit.

B8. The dendritic heat exchanger of paragraph B7 wherein the threshold fraction is at least one of:
 (i) at least 50%, at least 60%, at least 70%, at least 80%, at least 90%, at least 100%, at least 200%, at least 300%, or at least 400%; and
 (ii) at most 600%, at most 500%, at most 400%, at most 300%, at most 200%, at most 150%, at most 140%, at most 130%, at most 120%, at most 110%, or at most 100%.

B9. The dendritic heat exchanger of any of paragraphs B1-B8, wherein the branching region is a first branching region, wherein the plurality of branch conduits is a plurality of first branch conduits, and further wherein each dendritic tubular includes a second branching region defining a plurality of second branch conduits.

B10. The dendritic heat exchanger of paragraph B9, wherein at least two second branch conduits in the plurality of second branch conduits extend from each first branch conduit in the plurality of first branch conduits.

B11. The dendritic heat exchanger of paragraph B10, wherein the at least two branch conduits are configured to receive a respective sub-fraction of the respective fraction of the portion of the second fluid inlet stream from the first branch conduit and to provide the respective sub-fraction of the respective fraction of the portion of the second fluid inlet stream to the second fluid outlet to at least partially define the second fluid outlet stream.

B12. The dendritic heat exchanger of any of paragraphs B1-B11, wherein each dendritic tubular defines a plurality of subsequent branching regions, wherein each subsequent branching region in the plurality of subsequent branching regions is configured to receive a corresponding sub-fraction of the respective fraction of the portion of the second fluid inlet stream from an upstream branching region.

B13. The dendritic heat exchanger of any of paragraphs B1-B12, wherein each dendritic tubular further includes a combining region configured to receive the respective fraction of the portion of the second fluid inlet stream from at least two branch conduits to at least partially define the second fluid outlet stream.

B14. The dendritic heat exchanger of any of paragraphs B1-B13, wherein the plurality of dendritic tubulars includes a plurality of elongate dendritic tubulars.

B15. The dendritic heat exchanger of any of paragraphs B1-B14, wherein the plurality of dendritic tubulars extends along an elongate axis of the housing volume.

B16. The dendritic heat exchanger of any of paragraphs B1-B15, wherein the plurality of dendritic tubulars is spaced apart within the housing volume.

B17. The dendritic heat exchanger of any of paragraphs B1-B16, wherein each dendritic tubular in the plurality of dendritic tubulars extends along a corresponding tubular axis, and further wherein the corresponding tubular axis of each dendritic tubular in the plurality of dendritic tubulars is parallel, or at least substantially parallel, to the corresponding tubular axis of each other dendritic tubular in the plurality of dendritic tubulars.

B18. The dendritic heat exchanger of any of paragraphs B1-B17, wherein the heat exchange structure further includes a supporting element that supports the plurality of dendritic tubulars within the housing volume.

B19. The dendritic heat exchanger of paragraph B18, wherein the supporting element includes at least one of:
 (i) a porous supporting element;
 (ii) a thermally conductive supporting element;
 (iii) a heat transfer-enhancing structure; and
 (iv) a fluid-impermeable supporting element.

B20. The dendritic heat exchanger of any of paragraphs B1-B19, wherein, within a/the transverse cross-section of the heat exchange structure, at least one of:
 (i) the plurality of dendritic tubulars is arranged in a patterned array;
 (ii) the plurality of dendritic tubulars is arranged at vertices of a regular geometric shape;
 (iii) the plurality of dendritic tubulars is arranged at vertices of a triangle;
 (iv) the plurality of dendritic tubulars is arranged at vertices of a rectangle;
 (v) the plurality of dendritic tubulars is arranged at vertices of a hexagon; and
 (vi) the plurality of dendritic tubulars is arranged at vertices of a repeating geometric shape.

B21. The dendritic heat exchanger of any of paragraphs B1-B20, wherein the heat exchange structure further includes a plurality of internal walls, wherein each internal wall in the plurality of internal walls extends between, and along a length of, a corresponding pair of the plurality of dendritic tubulars.

B22. The dendritic heat exchanger of any of paragraphs B1-B21, wherein the dendritic heat exchanger further includes a plurality of heat transfer-enhancing structures configured to enhance heat transfer between the first fluid stream and the second fluid stream.

B23. The dendritic heat exchanger of paragraph B22, wherein the plurality of heat transfer-enhancing structures includes at least one of:
 (i) a plurality of projections;
 (ii) a plurality of pins;
 (iii) a plurality of posts; and
 (iv) a plurality of fins.

B24. The dendritic heat exchanger of any of paragraphs B1-B23, wherein at least a subset of the plurality of heat transfer-enhancing structures at least one of:
 (i) projects from the elongate housing;
 (ii) projects from the plurality of dendritic tubulars; and
 (iii) projects between the elongate housing and the plurality of dendritic tubulars to mechanically support the plurality of dendritic tubulars within the housing volume.

B25. The dendritic heat exchanger of any of paragraphs B1-B24, wherein at least one of:
 (i) the first fluid inlet is defined on the first end of the elongate housing; and
 (ii) the second fluid inlet is defined on the second end of the elongate housing.

B26. The dendritic heat exchanger of any of paragraphs B1-B25, wherein at least one of:
 (i) the first fluid inlet and the second fluid inlet are defined on the first end of the elongate housing; and
 (ii) the first fluid inlet and the second fluid inlet are defined on opposed ends of the elongate housing.

B26 The dendritic heat exchanger of any of paragraphs B14325, wherein the dendritic heat exchanger at least one of:
 (i) includes a unitary structure that defines at least the elongate housing and the heat exchange structure; and
 (ii) is formed via additive manufacturing.

C1. A method of exchanging heat and attenuating sound with a sound-attenuating heat exchanger, the method comprising:

flowing a first fluid stream, which includes a first fluid, across an aerodynamically shaped surface defined by an aerodynamically shaped layer of the sound-attenuating heat exchanger;

receiving, into a sound-attenuating volume that is at least partially defined by the aerodynamically shaped layer and via a plurality of apertures defined within the aerodynamically shaped layer, a sound wave that propagates within the first fluid stream;

attenuating the sound wave within the sound-attenuating volume;

receiving, with a cooled fluid containment conduit that is at least partially defined by a cooled fluid containment body of the sound-attenuating heat exchanger, a cooled stream that includes a second fluid;

receiving, into an elongate cooling conduit that is at least partially defined by a base of the sound-attenuating heat exchanger, a cooling stream, which includes the first fluid, in heat exchange relationship with the cooled fluid containment body; and maintaining fluid separation between the cooling stream and the cooled stream within the sound-attenuating heat exchanger.

C2. The method of paragraph C1, wherein the sound-attenuating heat exchanger includes any suitable structure, function, and/or feature of any of the sound-attenuating heat exchangers of any of paragraphs A1-A28.

C3. The method of any of paragraphs C1-C2, wherein the receiving the cooling stream includes receiving a compressed air stream from a fan of a jet engine of an aircraft.

C4. The method of any of paragraphs C1-C3, wherein the receiving the cooled stream includes receiving the cooled stream from a cooled component of a/the jet engine of an/the aircraft.

C5. The method of paragraph C4, wherein the method further includes flowing the cooled stream in a closed loop within the aircraft.

D1. A method of exchanging heat in a dendritic heat exchanger, the method comprising:

receiving, into a housing volume and via a first fluid inlet of an elongate housing, a first fluid stream as a first fluid inlet stream;

flowing, within the housing volume, the first fluid stream in heat exchange relationship with a heat exchange structure that extends within the housing volume;

emitting, from the housing volume and via a first fluid outlet of the elongate housing, the first fluid stream as a first fluid outlet stream;

receiving, into the heat exchange structure and via a second fluid inlet of the elongate housing, a second fluid stream as a second fluid inlet stream;

dividing, within the heat exchange structure, the second fluid inlet stream into a plurality of portions of the second fluid inlet stream;

flowing, within a corresponding inlet conduit of a corresponding dendritic tubular of a plurality of dendritic tubulars of the heat exchange structure, each portion in the plurality of portions of the second fluid inlet stream;

dividing, within a branching region of each dendritic tubular of the plurality of dendritic tubulars, each portion in the plurality of portions of the second fluid inlet stream into a plurality of respective fractions of each portion in the plurality of portions of the second fluid inlet stream;

flowing, within a plurality of branch conduits of each dendritic tubular, the plurality of respective fractions of each portion in the plurality of portions of the second fluid inlet stream; and emitting, from the housing volume and via a second fluid outlet of the elongate housing, the plurality of respective fractions of each portion in the plurality of portions of the second fluid inlet stream as a second fluid outlet stream.

D2. The method of paragraph D1, wherein the dendritic heat exchanger includes any suitable structure, function, and/or feature of any of the dendritic heat exchangers of any of paragraphs B1-B26.

D3. The method of any of paragraphs D1-D2, wherein the receiving the first fluid stream includes receiving a compressed air stream from a fan of a jet engine of an aircraft.

D4. The method of any of paragraphs D1-D3, wherein the receiving the second fluid stream includes receiving the second fluid stream from a cooled component of a/the jet engine of a/the aircraft.

D5. The method of paragraph D4, wherein the method further includes flowing the second fluid stream in a closed loop within the aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A dendritic heat exchanger configured to exchange thermal energy between a first fluid stream and a second fluid stream, the dendritic heat exchanger comprising:
    an elongate housing extending between a first end and an opposed second end and defining:
    (i) a housing volume;
    (ii) a first fluid inlet configured to receive the first fluid stream, as a first fluid inlet stream, into the housing volume;
    (iii) a first fluid outlet configured to emit the first fluid stream, as a first fluid outlet stream, from the housing volume;
    (iv) a second fluid inlet configured to receive the second fluid stream, as a second fluid inlet stream, into the housing volume; and
    (v) a second fluid outlet configured to emit the second fluid stream, as a second fluid outlet stream, from the housing volume; and
    a heat exchange structure extending within the housing volume, wherein the heat exchange structure includes a plurality of dendritic tubulars, and further wherein each dendritic tubular in the plurality of dendritic tubulars includes:
    (i) an inlet region defining an inlet conduit configured to receive a portion of the second fluid inlet stream from the second fluid inlet; and
    (ii) a branching region defining a plurality of branch conduits that extends from the inlet conduit, wherein each branch conduit in the plurality of branch conduits is configured to receive a respective fraction of the portion of the second fluid inlet stream from the inlet conduit and to provide the respective fraction of the portion of the second fluid inlet stream to the second fluid outlet to at least partially define the second fluid outlet stream;
    wherein the dendritic heat exchanger includes a unitary structure that defines at least the elongate housing and the heat exchange structure; and
    wherein a transverse cross-sectional area of each branch conduit in the plurality of branch conduits is less than a transverse cross-sectional area of the inlet conduit.

2. The dendritic heat exchanger of claim 1, wherein the heat exchange structure is configured to flow the second fluid stream, within the housing volume, in heat exchange relationship with the first fluid stream and also to maintain fluid separation between the first fluid stream and the second fluid stream within the housing volume.

3. The dendritic heat exchanger of claim 1, wherein the branching region is a first branching region, wherein the plurality of branch conduits is a plurality of first branch conduits, and further wherein each dendritic tubular includes a second branching region defining a plurality of second branch conduits.

4. The dendritic heat exchanger of claim 3, wherein at least two second branch conduits in the plurality of second branch conduits extend from each first branch conduit in the plurality of first branch conduits.

5. The dendritic heat exchanger of claim 1, wherein each dendritic tubular defines a plurality of subsequent branching regions, wherein each subsequent branching region in the plurality of subsequent branching regions is configured to receive a corresponding sub-fraction of the respective fraction of the portion of the second fluid inlet stream from an upstream branching region.

6. The dendritic heat exchanger of claim 1, wherein each dendritic tubular further includes a combining region configured to receive the respective fraction of the portion of the second fluid inlet stream from at least two branch conduits to at least partially define the second fluid outlet stream.

7. The dendritic heat exchanger of claim 1, wherein the plurality of dendritic tubulars includes a plurality of elongate dendritic tubulars extending along an elongate axis of the housing volume.

8. The dendritic heat exchanger of claim 1, wherein the plurality of dendritic tubulars is spaced apart within the housing volume.

9. The dendritic heat exchanger of claim 8, wherein the heat exchange structure further includes a supporting element that supports the plurality of dendritic tubulars within the housing volume.

10. The dendritic heat exchanger of claim 9, wherein the supporting element includes at least one of:
    (i) a porous supporting element;
    (ii) a thermally conductive supporting element;
    (iii) a heat transfer-enhancing structure; and
    (iv) a fluid-impermeable supporting element.

11. The dendritic heat exchanger of claim 1, wherein, within a transverse cross-section of the heat exchange structure, at least one of:
    (i) the plurality of dendritic tubulars is arranged in a patterned array;
    (ii) the plurality of dendritic tubulars is arranged at vertices of a regular geometric shape;
    (iii) the plurality of dendritic tubulars is arranged at vertices of a triangle;

(iv) the plurality of dendritic tubulars is arranged at vertices of a rectangle;

(v) the plurality of dendritic tubulars is arranged at vertices of a hexagon; and (vi) the plurality of dendritic tubulars is arranged at vertices of a repeating geometric shape.

12. The dendritic heat exchanger of claim 1, wherein the heat exchange structure further includes a plurality of internal walls, wherein each internal wall in the plurality of internal walls extends between, and along a length of, a corresponding pair of the plurality of dendritic tubulars.

13. The dendritic heat exchanger of claim 1, wherein the dendritic heat exchanger further includes a plurality of heat transfer-enhancing structures configured to enhance heat transfer between the first fluid stream and the second fluid stream.

14. The dendritic heat exchanger of claim 13, wherein at least a subset of the plurality of heat transfer-enhancing structures at least one of:

(i) projects from the elongate housing;

(ii) projects from the plurality of dendritic tubulars; and (iii) projects between the elongate housing and the plurality of dendritic tubulars to mechanically support the plurality of dendritic tubulars within the housing volume.

15. A jet engine installation, comprising:

a fan;

a fan housing;

a turbine assembly mechanically coupled to, and configured to rotate with, the fan;

a turbine housing at least partially surrounding the turbine assembly;

a nacelle at least partially surrounding the fan, the turbine, and the turbine housing; and the dendritic heat exchanger of claim 1.

16. An aircraft including the jet engine installation of claim 15.

17. A sound-attenuating heat exchanger, comprising:

an aerodynamically shaped layer;

a base;

an intermediate layer extending at least partially between the aerodynamically shaped layer and the base; and the dendritic heat exchanger of claim 1;

wherein:

(i) the aerodynamically shaped layer defines a plurality of apertures;

(ii) the aerodynamically shaped layer and the intermediate layer together define a sound-attenuating volume; and (iii) the intermediate layer and the base together define the elongate housing.

18. The sound-attenuating heat exchanger of claim 17, wherein the dendritic heat exchanger is a first dendritic heat exchanger that includes a first elongate housing, wherein the sound-attenuating heat exchanger further includes a second dendritic heat exchanger that includes a second elongate housing, and further wherein the intermediate layer and the aerodynamically shaped layer together define the second elongate housing.

19. A method of exchanging heat in the dendritic heat exchanger of claim 1, the method comprising:

receiving, into the housing volume and via the first fluid inlet, the first fluid stream as the first fluid inlet stream;

flowing, within the housing volume, the first fluid stream in heat exchange relationship with the heat exchange structure;

emitting, from the housing volume and via the first fluid outlet, the first fluid stream as the first fluid outlet stream;

receiving, into the heat exchange structure and via the second fluid inlet, the second fluid stream as the second fluid inlet stream;

dividing, within the heat exchange structure, the second fluid inlet stream into a plurality of portions of the second fluid inlet stream;

flowing, within a corresponding inlet conduit of a corresponding dendritic tubular of the plurality of dendritic tubulars of the heat exchange structure, each portion in the plurality of portions of the second fluid inlet stream;

dividing, within the branching region of each dendritic tubular of the plurality of dendritic tubulars, each portion in the plurality of portions of the second fluid inlet stream into a plurality of respective fractions of each portion in the plurality of portions of the second fluid inlet stream;

flowing, within the plurality of branch conduits of each dendritic tubular, the plurality of respective fractions of each portion in the plurality of portions of the second fluid inlet stream, wherein a transverse cross-sectional area of each branch conduit in the plurality of branch conduits is less than a transverse cross-sectional area of the inlet conduit; and emitting, from the housing volume and via the second fluid outlet, the plurality of respective fractions of each portion in the plurality of portions of the second fluid inlet stream as the second fluid outlet stream.

20. A sound-attenuating heat exchanger, comprising:

an aerodynamically shaped layer;

a base;

an intermediate layer extending at least partially between the aerodynamically shaped layer and the base; and a dendritic heat exchanger configured to exchange thermal energy between a first fluid stream and a second fluid stream, the dendritic heat exchanger comprising:

an elongate housing extending between a first end and an opposed second end and defining:

(i) a housing volume;

(ii) a first fluid inlet configured to receive the first fluid stream, as a first fluid inlet stream, into the housing volume;

(iii) a first fluid outlet configured to emit the first fluid stream, as a first fluid outlet stream, from the housing volume;

(iv) a second fluid inlet configured to receive the second fluid stream, as a second fluid inlet stream, into the housing volume; and (v) a second fluid outlet configured to emit the second fluid stream, as a second fluid outlet stream, from the housing volume; and a heat exchange structure extending within the housing volume, wherein the heat exchange structure includes a plurality of dendritic tubulars, and further wherein each dendritic tubular in the plurality of dendritic tubulars includes:

(i) an inlet region defining an inlet conduit configured to receive a portion of the second fluid inlet stream from the second fluid inlet; and (ii) a branching region defining a plurality of branch conduits that extends from the inlet conduit, wherein each branch conduit in the plurality of branch conduits is configured to receive a respective fraction of the portion of the second fluid inlet stream from the inlet conduit and to provide the respective fraction of the portion of the second fluid inlet stream to the second fluid outlet to at least partially define the second fluid outlet stream;

wherein:
(i) the aerodynamically shaped layer defines a plurality of apertures;
(ii) the aerodynamically shaped layer and the intermediate layer together define a sound-attenuating volume; and
(iii) the intermediate layer and the base together define the elongate housing.

21. The sound-attenuating heat exchanger of claim 17, wherein the dendritic heat exchanger is a first dendritic heat exchanger that includes a first elongate housing, wherein the sound-attenuating heat exchanger further includes a second dendritic heat exchanger that includes a second elongate housing, and further wherein the intermediate layer and the aerodynamically shaped layer together define the second elongate housing.

22. A dendritic heat exchanger configured to exchange thermal energy between a first fluid stream and a second fluid stream, the dendritic heat exchanger comprising:
an elongate housing extending between a first end and an opposed second end and defining:
(i) a housing volume;
(ii) a first fluid inlet configured to receive the first fluid stream, as a first fluid inlet stream, into the housing volume;
(iii) a first fluid outlet configured to emit the first fluid stream, as a first fluid outlet stream, from the housing volume;
(iv) a second fluid inlet configured to receive the second fluid stream, as a second fluid inlet stream, into the housing volume; and
(v) a second fluid outlet configured to emit the second fluid stream, as a second fluid outlet stream, from the housing volume; and
a heat exchange structure extending within the housing volume, wherein the heat exchange structure includes a plurality of dendritic tubulars, and further wherein each dendritic tubular in the plurality of dendritic tubulars includes:
(i) an inlet region defining an inlet conduit configured to receive a portion of the second fluid inlet stream from the second fluid inlet; and
(ii) a branching region defining a plurality of branch conduits that extends from the inlet conduit, wherein each branch conduit in the plurality of branch conduits is configured to receive a respective fraction of the portion of the second fluid inlet stream from the inlet conduit and to provide the respective fraction of the portion of the second fluid inlet stream to the second fluid outlet to at least partially define the second fluid outlet stream;

wherein the heat exchange structure further includes a plurality of internal walls, wherein each internal wall in the plurality of internal walls extends between, and along a length of, a corresponding pair of dendritic tubulars of the plurality of dendritic tubulars;

wherein the dendritic heat exchanger includes a unitary structure that defines at least the elongate housing and the heat exchange structure.

23. A dendritic heat exchanger configured to exchange thermal energy between a first fluid stream and a second fluid stream, the dendritic heat exchanger comprising:
an elongate housing extending between a first end and an opposed second end and defining:
(i) a housing volume;
a first fluid inlet configured to receive the first fluid stream, as a first fluid inlet stream, into the housing volume;
(iii) a first fluid outlet configured to emit the first fluid stream, as a first fluid outlet stream, from the housing volume;
(iv) a second fluid inlet configured to receive the second fluid stream, as a second fluid inlet stream, into the housing volume; and
(v) a second fluid outlet configured to emit the second fluid stream, as a second fluid outlet stream, from the housing volume; and
a heat exchange structure extending within the housing volume, wherein the heat exchange structure includes a plurality of dendritic tubulars, and further wherein each dendritic tubular in the plurality of dendritic tubulars includes:
(i) an inlet region defining an inlet conduit configured to receive a portion of the second fluid inlet stream from the second fluid inlet; and
(ii) a branching region defining a plurality of branch conduits that extends from the inlet conduit, wherein each branch conduit in the plurality of branch conduits is configured to receive a respective fraction of the portion of the second fluid inlet stream from the inlet conduit and to provide the respective fraction of the portion of the second fluid inlet stream to the second fluid outlet to at least partially define the second fluid outlet stream;
wherein the dendritic heat exchanger includes a unitary structure that defines at least the elongate housing and the heat exchange structure; and
wherein the dendritic heat exchanger further includes a plurality of heat transfer-enhancing structures configured to enhance heat transfer between the first fluid stream and the second fluid stream.

* * * * *

UNITED STATES PATENT AND TRADEMARK OFFICE
CERTIFICATE OF CORRECTION

PATENT NO.        : 10,619,570 B2
APPLICATION NO.   : 15/812971
DATED             : April 14, 2020
INVENTOR(S)       : David William Foutch and Belur Shivashankara Page 1 of 1

It is certified that error appears in the above-identified patent and that said Letters Patent is hereby corrected as shown below:

In the Claims

Claim 23, Column 32, Line 15 add --"(ii)"-- at the beginning of the line before "a first fluid inlet...".

Signed and Sealed this
Twenty-fifth Day of August, 2020

Andrei Iancu
*Director of the United States Patent and Trademark Office*